US010390035B2

(12) United States Patent
Mora et al.

(10) Patent No.: US 10,390,035 B2
(45) Date of Patent: Aug. 20, 2019

(54) VIDEO ENCODING AND DECODING BY INHERITANCE OF A FIELD OF MOTION VECTORS

(71) Applicant: Orange, Paris (FR)

(72) Inventors: Elie Gabriel Mora, Paris (FR); Joel Jung, Le Mesnil Saint Denis (FR); Beatrice Pesquet-Popescu, Bailly Romainvilliers (FR); Marco Cagnazzo, Gif sur Yvette (FR)

(73) Assignee: ORANGE, Paris (FR)

( * ) Notice: Subject to any disclaimer, the term of this patent is extended or adjusted under 35 U.S.C. 154(b) by 65 days.

(21) Appl. No.: 15/024,753

(22) PCT Filed: Sep. 23, 2014

(86) PCT No.: PCT/FR2014/052378
§ 371 (c)(1),
(2) Date: Mar. 24, 2016

(87) PCT Pub. No.: WO2015/044581
PCT Pub. Date: Apr. 2, 2015

(65) Prior Publication Data
US 2016/0219299 A1    Jul. 28, 2016

(30) Foreign Application Priority Data

Sep. 27, 2013 (FR) ...................... 13 59328

(51) Int. Cl.
*H04N 19/503*  (2014.01)
*H04N 19/513*  (2014.01)
(Continued)

(52) U.S. Cl.
CPC ............ *H04N 19/52* (2014.11); *H04N 19/54* (2014.11); *H04N 19/597* (2014.11); *H04N 19/96* (2014.11)

(58) Field of Classification Search
CPC ........ H04N 19/52; H04N 19/96; H04N 19/54; H04N 19/597
See application file for complete search history.

(56) References Cited

U.S. PATENT DOCUMENTS 6,314,211 B1 * 11/2001 Kim ..................... G06K 9/20
                                                    382/285
7,092,443 B2 * 8/2006 Francois .............. H04N 19/176
                                                    375/240.11
(Continued)

FOREIGN PATENT DOCUMENTS

WO     2012096164 A1    7/2012

OTHER PUBLICATIONS

International Search Report dated Nov. 13, 2014 for corresponding International Application No. PCT/FR2014/052378, filed Sep. 23, 2014.
(Continued)

*Primary Examiner* — Sathyanaraya V Perungavoor
*Assistant Examiner* — Philip P. Dang
(74) *Attorney, Agent, or Firm* — David D. Brush; Westman, Champlin & Koehler P.A.

(57) ABSTRACT

A method is provided for coding a current image. The method includes determining, in a first image, different from the current image, a group of k' pixels corresponding to a current group of k pixels (k'≤k) to be coded of the current image; calculating a motion vector between each of the k' pixels of the first image and a corresponding pixel of a second image different from the current image, on completion of which a field of k' motion vectors is obtained; and predicting the pixels or of the motion of the current group of k pixels of the current image on the basis of the field of k' motion vectors which is obtained.

15 Claims, 11 Drawing Sheets

(51) Int. Cl.
*H04N 19/52* (2014.01)
*H04N 19/597* (2014.01)
*H04N 19/54* (2014.01)
*H04N 19/96* (2014.01)

(56) References Cited

U.S. PATENT DOCUMENTS

| | | | | |
|---|---|---|---|---|
| 7,317,839 B2* | 1/2008 | Holcomb | ............... | H04N 19/70 375/E7.138 |
| 7,336,720 B2* | 2/2008 | Martemyanov | ..... | H03M 7/4006 375/240.12 |
| 7,426,308 B2* | 9/2008 | Hsu | ............... | H04N 19/52 375/E7.125 |
| 7,471,298 B1* | 12/2008 | Noonburg | ............ | H04N 19/186 345/531 |
| 7,532,808 B2* | 5/2009 | Lainema | ............... | H04N 19/176 386/328 |
| 7,555,167 B2* | 6/2009 | Srinivasan | ........... | H04N 19/105 382/239 |
| 7,567,617 B2* | 7/2009 | Holcomb | ............... | H04N 19/52 375/240.13 |
| 7,577,198 B2* | 8/2009 | Holcomb | ............... | H04N 19/70 375/240.13 |
| 7,577,305 B2* | 8/2009 | Srinivasan | ........... | H04N 19/136 382/238 |
| 7,599,438 B2* | 10/2009 | Holcomb | ............... | H04N 19/70 375/240.23 |
| 7,606,308 B2* | 10/2009 | Holcomb | ............... | H04N 19/70 375/240.16 |
| 7,606,311 B2* | 10/2009 | Hsu | ............... | H04N 19/52 375/240.14 |
| 7,616,692 B2* | 11/2009 | Holcomb | ............... | H04N 19/70 375/240.16 |
| 7,620,106 B2* | 11/2009 | Holcomb | ............... | H04N 19/70 375/240.16 |
| 7,623,574 B2* | 11/2009 | Holcomb | ............... | H04N 19/70 375/240.16 |
| 7,903,737 B2* | 3/2011 | Martinian | ............ | H04N 19/597 348/207.99 |
| 7,916,796 B2* | 3/2011 | Yan | ............... | H04N 19/895 375/240.16 |
| 7,924,920 B2* | 4/2011 | Hsu | ............... | H04N 19/52 375/240.14 |
| 8,009,739 B2* | 8/2011 | Holcomb | ............... | H04N 19/70 375/240.23 |
| 8,170,210 B2* | 5/2012 | Manders | ............... | H04N 5/783 380/217 |
| 8,428,143 B2* | 4/2013 | Schwarz | ............... | H04N 19/147 375/240.16 |
| 8,792,549 B2* | 7/2014 | Liu | ............... | H04N 19/176 375/240.01 |
| 2002/0009144 A1* | 1/2002 | Ishihara | ............... | H04N 5/145 375/240.16 |
| 2002/0181591 A1* | 12/2002 | Francois | ............... | H04N 19/176 375/240.16 |
| 2005/0053146 A1* | 3/2005 | Mukerjee | ............... | H04N 19/105 375/240.16 |
| 2008/0304810 A1* | 12/2008 | Rijckaert | ............... | H04N 5/783 386/344 |
| 2009/0074073 A1* | 3/2009 | Srinivasan | ............. | H04N 19/51 375/240.16 |
| 2009/0116558 A1* | 5/2009 | Chen | ............... | H04N 19/597 375/240.16 |
| 2010/0195713 A1* | 8/2010 | Coulombe | ........... | H04N 19/172 375/240.02 |
| 2011/0090960 A1* | 4/2011 | Leontaris | ............. | H04N 19/103 375/240.12 |
| 2011/0176740 A1* | 7/2011 | Teo | ............... | H04N 19/139 382/236 |
| 2011/0194613 A1* | 8/2011 | Chen | ............... | H04N 19/176 375/240.24 |
| 2011/0200097 A1* | 8/2011 | Chen | ............... | H04N 19/52 375/240.02 |
| 2011/0200111 A1* | 8/2011 | Chen | ............... | H04N 19/52 375/240.16 |
| 2011/0206125 A1* | 8/2011 | Chien | ............... | H04N 19/52 375/240.16 |
| 2011/0280311 A1* | 11/2011 | Chen | ............... | H04N 19/597 375/240.24 |
| 2012/0189055 A1* | 7/2012 | Chien | ............... | H04N 19/52 375/240.14 |
| 2012/0195368 A1* | 8/2012 | Chien | ............... | H04N 19/52 375/240.02 |
| 2012/0213271 A1* | 8/2012 | Chong | ............... | H04N 7/26255 375/240.02 |
| 2012/0229602 A1* | 9/2012 | Chen | ............... | H04N 19/597 348/43 |
| 2012/0320968 A1* | 12/2012 | Zheng | ............... | H04N 19/40 375/240.02 |
| 2013/0182769 A1* | 7/2013 | Yu | ............... | H04N 19/105 375/240.16 |
| 2013/0243081 A1* | 9/2013 | Chen | ............... | H04N 19/597 375/240.02 |
| 2013/0243093 A1* | 9/2013 | Chen | ............... | H04N 19/597 375/240.16 |
| 2013/0293676 A1 | 11/2013 | Sugio et al. | | |

OTHER PUBLICATIONS

Jungdong Seo et al., "Motion Information Sharing Mode for Depth Video Coding", 3DTV-Conference: The True Vision—Capture, Transmission and Display of 3D Video (3DTV-CON), 2010, IEEE, Piscataway, NJ, USA, Jun. 7, 2010 (Jun. 7, 2010), pp. 1-4, XP031706528.

Jiangbo Lu et al., "An Epipolar Geometry-Based Fast Disparity Estimation Algorithm for Multiview Image and Video Coding", IEEE Transactions on Circuits and Systems for Video Technology, IEEE Service Center, Piscataway, NJ, US, vol. 17, No. 6, Jun. 1, 2007 (Jun. 1, 2007), pp. 737-750, XP011182751.

Written Opinion dated Nov. 13, 2014 for corresponding International Application No. PCT/FR2014/052378, filed Sep. 23, 2014.

English Translation of the International Written Opinion dated Mar. 29, 2016, for corresponding International Application No. PCT/FR2014/052378 filed, Sep. 23, 2014.

Sullivan et al., "Rate-Distortion Optimization for Video Compression", IEEE Signal Processing Magazine, pp. 74-90, Nov. 1998.

* cited by examiner

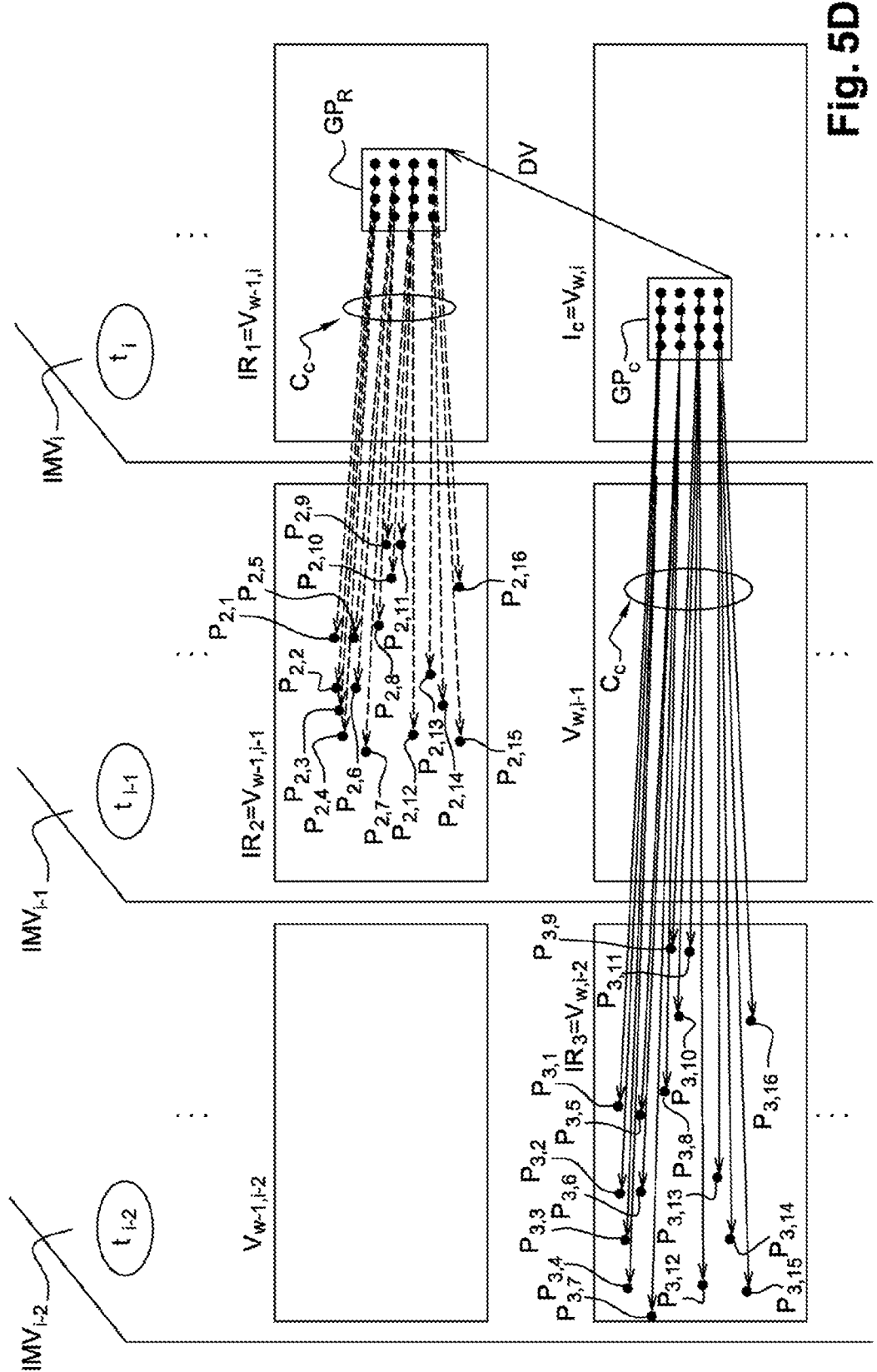

VIDEO ENCODING AND DECODING BY INHERITANCE OF A FIELD OF MOTION VECTORS

CROSS-REFERENCE TO RELATED APPLICATIONS

This Application is a Section 371 National Stage Application of International Application No. PCT/FR2014/052378, filed Sep. 23, 2014, the content of which is incorporated herein by reference in its entirety, and published as WO 2015/044581 on Apr. 2, 2015, not in English.

FIELD OF THE INVENTION

The present invention pertains in a general manner to the field of image processing and more precisely to the coding and to the decoding of digital images and of sequences of digital images.

The coding/decoding of digital images applies in particular to images arising from at least one video sequence comprising:
- images arising from one and the same camera and following one another temporally (coding/decoding of 2D type),
- images arising from various cameras oriented according to different views (coding/decoding of 3D type),
- corresponding components of texture and of depth (coding/decoding of 3D type),
- etc. . . .

The present invention applies in a similar manner to the coding/decoding of images of 2D or 3D type.

It relates in particular, but not exclusively, to 3D video applications which implement a coding/decoding of images arising from various cameras.

The invention may in particular, but not exclusively, apply to the video coding implemented in the AVC and HEVC contemporary video coders and their extensions (MVC, 3D-AVC, MV-HEVC, 3D-HEVC, etc), and to the corresponding decoding.

BACKGROUND OF THE INVENTION

The HEVC standard is similar to the H.264 previous standard, in the sense that it can use a block-wise representation of the video sequence.

In a similar manner to the H.264 standard, the aforementioned HEVC standard implements:
- an intra prediction which consists in predicting pixels of a current image with respect to already coded and then decoded pixels of this current image,
- an inter prediction which consists in predicting the motion or the pixels of a current image with respect to one or more images of the sequence which have already been coded, and then decoded. Such images are conventionally called reference images and are preserved in memory either at the coder or at the decoder.

More precisely, the images are cut up into blocks of pixels called CTUs (the abbreviation standing for "Coded Treeblocks Unit") which are similar to the macroblocks of the H.264 standard. These CTU blocks can thereafter be subdivided into smaller blocks called CUs (the abbreviation standing for "Coding Unit"), each of these CU blocks or each CTU block being coded by intra or inter image prediction.

Conventionally, the coding of a current block is carried out with the aid of a prediction of the motion or of the pixels of the current block, delivering a predictor block or else one or more predictor motion vectors, and of a prediction residual, corresponding respectively to a difference between the current block and the predictor block or between the motion of the current block and the predictor motion. This prediction residual is transmitted to the decoder, which reconstructs the block or the current motion vectors by adding this residual to the prediction.

In the HEVC standard for example, when a CTU block is cut up into CU blocks, a data stream, corresponding to each CU block, is transmitted to the decoder. Such a stream comprises:
- residual data which are the coefficients of the quantized residual CU blocks and optionally, during a coding in Inter mode, residual data of the motion vectors,
- coding parameters which are representative of the mode of coding used, in particular:
  - the mode of prediction (intra prediction, inter prediction, prediction skip carrying out a prediction for which no information is transmitted to the decoder ("skip"));
  - information specifying the type of prediction (orientation, reference image, . . . );
  - the type of subdivision;
  - the type of transform, for example 4×4 DCT, 8×8 DCT, etc. . . .
  - etc. . . .

The inter prediction of a current block consists in predicting certain coding information associated with this current block, such as for example:
- the temporal motion vector of the current block with respect to a temporal motion vector associated with a block of reference pixels,
- the pixels of the current block with respect to the pixels of a block of reference pixels, which is situated in an image other than the current image to which the current block belongs.

In the case of video of 2D type, this other image is for example an image situated at a previous instant to the current instant at which the current image is situated.

In the case of video of 3D type where the current image is considered in a given view, this other image can belong for example to a view other than the given view. Said other view is for example situated at the same instant as said given view and represents the same scene as the given view, but from another viewpoint.

In the case of video of 3D type where the current image is considered to be a texture component and a prediction of motion of the current image is implemented with respect to a motion vector determined in an image other than the current image, this other image is for example a depth component associated with said texture component, the current block and the reference block having identical positions respectively in the texture component and in the depth component.

Being as it is the prediction of coding information such as a temporal motion vector, there is proposed in the HEVC norm the AMVP (for "Advanced Motion Vector Prediction") mode which introduces a list of candidate temporal motion vectors to predict the temporal motion vector of the current block. Only the difference (residual) between the motion vector of the current block and the best candidate temporal motion vector of the list in the sense of a bitrate-distortion criterion, and an index signaling the position of this better candidate vector in the list, are transmitted to the decoder, thus reducing the cost of transmission of the information related to the temporal motion vector of the current block.

The prediction in the AMVP mode is not very precise since all the vectors of a current block are predicted with the aid of a single predictor motion vector. Moreover, the fact of transmitting the residuals of motion vectors obtained in the data stream destined for the decoder is expensive in terms of bitrate. It follows from this that the performance of the video coding according to this mode is not optimized.

The HEVC norm also proposes the MERGE mode which avoids predicting an item of information regarding coding of a current block, such as for example a temporal motion vector or a disparity motion vector. It is recalled here that a disparity motion vector is a motion vector used within the framework of an inter-view prediction, in video of 3D type. It entails a motion vector which describes the motion between the current block of a current dependent view and a block corresponding to this current block in a previously coded and then decoded reference view, the current dependent view and the base view each being representative of one and the same scene at the same instant.

More precisely, the MERGE mode allows the current block to directly inherit motion parameters, composed of an index of the reference image and of a temporal motion vector or else of a disparity motion vector for a neighbor block of the current block chosen from a list of candidates. The motion vector of the current block thus chosen by inheritance from the list of candidate vectors does not then require to be coded insofar as the same principle can be applied during the decoding. In such a case, only the index of the candidate which has been chosen and optionally prediction residuals are transmitted in the stream of coded data.

Being as it is 2D or 3D decoding, it is done image by image, and for each image, CTU block by CTU block. For each CU block of a CTU block, the corresponding elements of the stream are read. The inverse quantization and the inverse transformation of the coefficients of the CU blocks are performed. Next, the prediction of each CU block is calculated and each CU block is reconstructed by adding the predictor to the decoded prediction residual.

Intra or inter coding by competition, such as implemented in the HEVC standard, thus relies on putting various coding parameters, such as those aforementioned, into competition with the aim of selecting the best mode of coding, that is to say that which will optimize the coding of the block considered according to a predetermined performance criterion, for example the bitrate/distortion cost well known to the person skilled in the art.

Moreover, in the domain of video compression, video indexation or the detection of objects for example, optical flow is a motion estimation technique which produces a dense field of motion vectors, associated with a current image.

In video compression applications, optical flow makes it possible to produce a dense field of motion vectors, associated with a current image to be coded and, more particularly, with each current block to be coded, when the current image is partitioned into blocks. More precisely, for each pixel of the current block to be coded, a motion vector is calculated which points at an already coded and then decoded reference image. The field of these motion vectors thus calculated is termed dense since the pixels of the reference image that are pointed at by these motion vectors are not necessarily contiguous. Such a technique differs from the conventional techniques of "block matching" which are customarily present in most video coding norms, and which, for a current block to be coded, calculate a single motion vector describing the motion between the current block to be coded and an already coded and then decoded reference block. Said reference block is chosen as minimizing a coding performance criterion, such as for example the distortion criterion well known to the person skilled in the art.

The optical flow technique makes it possible to obtain a more precise Inter prediction of the blocks of an image. However, each motion vector belonging to the dense field of motion vectors is necessarily transmitted to the decoder, thereby substantially increasing the signaling cost and, therefore, compensates all the potential gains that one might hope to obtain with this technique.

SUBJECT AND SUMMARY OF THE INVENTION

One of the aims of the invention is to remedy drawbacks of the aforementioned prior art.

For this purpose, a subject of the present invention relates to a coding method comprising a step of determining, in a first image different from the current image, a group of k' pixels corresponding to a current group of k pixels (k'≤k) to be coded of the current image.

Such a coding method is noteworthy in that it comprises the following steps:
calculation of a motion vector between each of the k' pixels of the first image and a corresponding pixel of a second image different from the current image, on completion of which a field of k' motion vectors is obtained,
prediction of the pixels or of the motion of the current group of k pixels of the current image on the basis of the field of k' motion vectors which is obtained.

First and second images is intended to mean reference images which have already been coded, and then decoded.

Motion vector is intended to mean a temporal motion vector. Such a motion vector must be distinguished from a disparity motion vector. For this purpose, in the subsequent description and for reasons of simplification:
a motion vector is henceforth interpreted as a temporal motion vector,
a disparity vector is henceforth interpreted as a disparity motion vector.

Having regard to the fact that the pixels of the second image, which are pointed at by the motion vectors arising from the first image, are not necessarily contiguous, the field of motion vectors thus calculated is termed dense. It advantageously constitutes a new predictor of the pixels or of motion of the current image which is liable to be selected from at least one list of candidate predictors. Such an arrangement thus makes it possible to increase the number of predictors liable to be put into competition during the prediction of the pixels or of the motion of a current image, without however worsening the bitrate, since the dense field of motion vectors will be recalculated at the decoder for the inverse prediction.

Such an arrangement furthermore makes it possible, during a coding by competition of Inter type, to avoid including, in the stream to be transmitted to the decoder, the information relating to the motion vectors which make up the field of motion vectors which is obtained. This therefore results in a non-negligible decrease in the signaling cost, insofar as such an arrangement is reproducible at the level of the decoder.

Finally, the fact that each pixel of a current group of pixels is associated with a motion vector of the field of motion vectors which is obtained no longer makes it necessary to cut more finely, in the current image, the CTU blocks into CU blocks, the aim of which was normally to render the prediction more precise, in particular in the zones of the image which contain several objects in motion. Such an arrangement is advantageous since it avoids transmitting the index and the size of the sub-partitioning to the decoder, thereby substantially decreasing the signaling cost.

According to a particular embodiment of the aforementioned coding method, the prediction step consists in predicting the k pixels of said current group of pixels by corresponding pixels of an image different from the current image, the corresponding pixels being pointed at respectively by the k' motion vectors of the field of motion vectors which is obtained, the coding method furthermore comprising the following steps:
- obtaining of a current residual group of pixels by calculating the difference between the current group of k pixels and the predictor group of pixels which is obtained on completion of the prediction step,
- formulation of a data stream containing the current residual group of pixels which is obtained.

Such an arrangement advantageously makes it possible to predict in a very precise manner the texture of a current group of pixels by inheritance of the calculated field of motion vectors.

According to another particular embodiment of the aforementioned coding method, the prediction step consists in predicting k motion vectors associated respectively with the k pixels of said current group of pixels, by the k' motion vectors of said field of motion vectors which is obtained, the coding method furthermore comprising the following steps:
- obtaining of a current residual field of motion vectors by calculating the difference between the k current motion vectors associated with the current group of pixels and the k' motion vectors of said field of motion vectors which is obtained,
- formulation of a data stream containing said current residual field of motion vectors which is obtained.

Such an arrangement advantageously makes it possible to predict in a very precise manner the motion of a current group of pixels by inheritance of the calculated field of motion vectors, each motion vector associated with a current pixel then being predicted by a corresponding motion vector of the calculated field of motion vectors. For this purpose, on coding, for each current pixel, a motion vector residual is calculated, intended to be transmitted in the stream destined for the decoder.

According to another particular embodiment of the aforementioned coding method, in the course of the prediction step, the following steps are undertaken:
- selection of a motion vector from among the k' motion vectors of the calculated field of motion vectors, by means of a mathematical or statistical function,
- prediction of a motion vector associated with the current group of pixels with the aid of the selected motion vector, the coding method furthermore comprising the following steps:
- obtaining of a current residual motion vector by calculating the difference between the motion vector associated with the current group of pixels and the predictor motion vector obtained on completion of the prediction step,
- formulation of a data stream containing the current residual motion vector obtained.

Such an arrangement advantageously makes it possible to benefit from a more significant choice of motion predictors, since the calculated field of motion vectors is composed of several motion vectors, and to select just a single one in the guise of predictor of motion of the current group of pixels, so as to reduce the resources in terms of calculations when coding, during the prediction of motion of the group of pixels.

According to another particular embodiment of the aforementioned coding method, when the image coding is of 3D type, the k' pixels of the first image are determined either as a group of pixels which is pointed at by a single disparity motion vector for the disparity between the current image and the first image, or as a group of pixels which are pointed at respectively by vectors of a field of disparity motion vectors for the disparity between the current image and the first image.

Such an arrangement is particularly advantageous within the framework of a 3D video coding or decoding. In such a context and by way of example, the current image and the first image are situated at the same current instant but in two different views, while the second image is situated in the same view as the first image but at an instant other than the current instant. Thus, such an arrangement makes it possible to select in a more optimal manner the first image's pixels on the basis of which the k' motion vectors of the calculated field of motion vectors will be used for the motion compensation of the current group of k pixels of the current image $I_C$. Indeed, as the current image and the first image belong to two different views, their motions are not aligned. In order to improve the precision of the prediction of the current group of pixels, a compensation for the disparity between the current image and the first image then turns out to be necessary. The disparity compensation can be performed by means of a single disparity vector or of a field of disparity vectors. The latter alternative is in particular more precise when the current group of pixels contains objects of different depth.

According to another particular embodiment of the aforementioned coding method,
- the aforementioned calculation step consists in calculating a plurality of fields of motion vectors between, on the one hand, pixels of a plurality of first images and, on the other hand, corresponding pixels in a plurality of second images different from the current image,
the coding method furthermore comprising a step of selecting a field of motion vectors from among the fields of motion vectors calculated, by means of a mathematical or statistical function,
- the prediction step consisting in predicting the motion or the pixels of the current group of pixels on the basis of the selected field of motion vectors.

Such an arrangement advantageously makes it possible to benefit from a more significant choice of fields of motion vectors, and to select the most suitable for predicting the texture or the motion of the current group of pixels, while making it possible to economize on the calculation resources when coding.

The various aforementioned modes or characteristics of embodiment can be added independently or in combination with one another, to the steps of the coding method such as is defined hereinabove.

The invention also relates to a device for coding a current image comprising a module for determining, in a first image different from the current image, a group of k' pixels corresponding to a current group of k pixels (k'≤k) to be coded of the current image. Such a coding device is suitable for implementing the aforementioned coding method.

Such a coding device is noteworthy in that it comprises:
a module for calculating a motion vector between each of the k' pixels of the first image and a corresponding pixel of a second image different from the current image, so as to obtain a field of k' motion vectors,
a module for predicting the pixels or the motion of the current group of k pixels of the current image on the basis of the field of k' motion vectors which is obtained.

The invention also relates to a method for decoding a data stream representative of a current coded image comprising a step of determining, in a first image different from the current image, a group of k' pixels corresponding to a current group of k pixels (k'≤k) to be decoded of the current image.

Such a decoding method is noteworthy in that it comprises the following steps:
calculation of k' motion vectors between each of the k' pixels of the first image and a corresponding pixel of a second image different from the current image, on completion of which a field of k' motion vectors is obtained,
inverse prediction of the pixels or of the motion of the current group of k pixels of the current image on the basis of the field of k' motion vectors which is obtained.

According to a particular embodiment of the aforementioned decoding method, the inverse prediction step consists in:
determining, in the data stream, a current residual group of pixels which is associated with the current group of k pixels,
reconstructing the k pixels of the current group of pixels on the basis of the corresponding pixels of an image different from the current image, the corresponding pixels being pointed at respectively by the k' motion vectors of the field of motion vectors which is obtained, and on the basis of the determined current residual group of pixels.

According to another particular embodiment of the aforementioned decoding method, the aforementioned inverse prediction step consists in:
determining, in the data stream, a current residual field of motion vectors which is associated with the current group of k pixels,
reconstructing k motion vectors associated respectively with the k pixels of the current group of pixels, on the basis of the k' motion vectors of the field of motion vectors which is obtained and of the determined current residual field of motion vectors.

According to another particular embodiment of the aforementioned decoding method, in the course of the inverse prediction step, the following steps are undertaken:
determination, in the data stream, of a current residual motion vector associated with the current group of k pixels,
selection of a motion vector from among the k' motion vectors of said field of motion vectors which is obtained, by means of a mathematical or statistical function,
reconstruction of a motion vector associated with the current group of pixels with the aid of the selected motion vector and of the determined current residual motion vector.

According to another particular embodiment of the aforementioned decoding method, when the image decoding is of 3D type, the k' pixels contained in the first image are determined either as a group of pixels which is pointed at by a single disparity motion vector for the disparity between the current image and the first image, or as a group of pixels whose pixels are pointed at respectively by vectors of a field of disparity motion vectors for the disparity between the current image and the first image.

According to another particular embodiment of the aforementioned decoding method,
the aforementioned calculation step consists in calculating a plurality of fields of motion vectors between, on the one hand, pixels of a plurality of first images and, on the other hand, corresponding pixels in a plurality of second images different from the current image,
said decoding method furthermore comprising a step of selecting a field of motion vectors from among the fields of motion vectors calculated, by means of a mathematical or statistical function,
the inverse prediction step consisting in reconstructing the motion or the pixels of the current group of pixels on the basis of the selected field of motion vectors.

The various aforementioned modes or characteristics of embodiment can be added independently or in combination with one another, to the steps of the decoding method such as is defined hereinabove.

The invention also relates to a device for decoding a data stream representative of a current image comprising a module for determining, in a first image different from the current image, a group of k' pixels corresponding to a current group of k pixels to be decoded (k'≤k) of the current image. Such a decoding device is suitable for implementing the aforementioned decoding method.

Such a decoding device is noteworthy in that it comprises:
a module for calculating a motion vector between each of the k' pixels of the first image and a corresponding pixel of a second image different from the current image, so as to obtain a field of k' motion vectors,
a module for inverse prediction of the current group of k pixels of said current image on the basis of the field of k' motion vectors which is obtained.

The invention further relates to a computer program comprising instructions for implementing the coding method or the decoding method according to the invention, when it is executed on a computer.

This program can use any programming language, and be in the form of source code, object code, or of code intermediate between source code and object code, such as in a partially compiled form, or in any other desirable form.

The invention is also aimed at a recording medium readable by a computer on which a computer program is recorded, this program comprising instructions suitable for the implementation of the coding or decoding method according to the invention, such as described hereinabove.

The recording medium can be any entity or device capable of storing the program. For example, the medium can comprise a storage means, such as a ROM, for example a CD ROM or a microelectronic circuit ROM, or else a magnetic recording means, for example a USB key or a hard disk.

Moreover, the recording medium can be a transmissible medium such as an electrical or optical signal, which can be conveyed via an electrical or optical cable, by radio or by other means. The program according to the invention can in particular be downloaded from a network of Internet type.

Alternatively, the recording medium can be an integrated circuit into which the program is incorporated, the circuit being suitable for executing or for being used in the execution of the aforementioned coding or decoding method.

The decoding method, the coding device, the decoding device, the computer programs and the corresponding aforementioned recording mediums exhibit at least the same advantages as those conferred by the coding and decoding method according to the present invention.

BRIEF DESCRIPTION OF THE DRAWINGS

Other characteristics and advantages will become apparent on reading preferred embodiments described with reference to the figures in which.

DETAILED DESCRIPTION OF THE GENERAL PRINCIPLE OF THE CODING PART

A general embodiment of the invention will now be described, in which the coding method according to the invention is used to code an image or a sequence of images according to a binary stream close to that obtained by a coding according to the HEVC standard. In this embodiment, the coding method according to the invention is for example implemented in a software or hardware manner by modifications of a coder initially compliant with the HEVC standard. The coding method according to the invention is represented in the form of an algorithm comprising steps C1 to C6, represented in FIG. 1.

Figure 2:
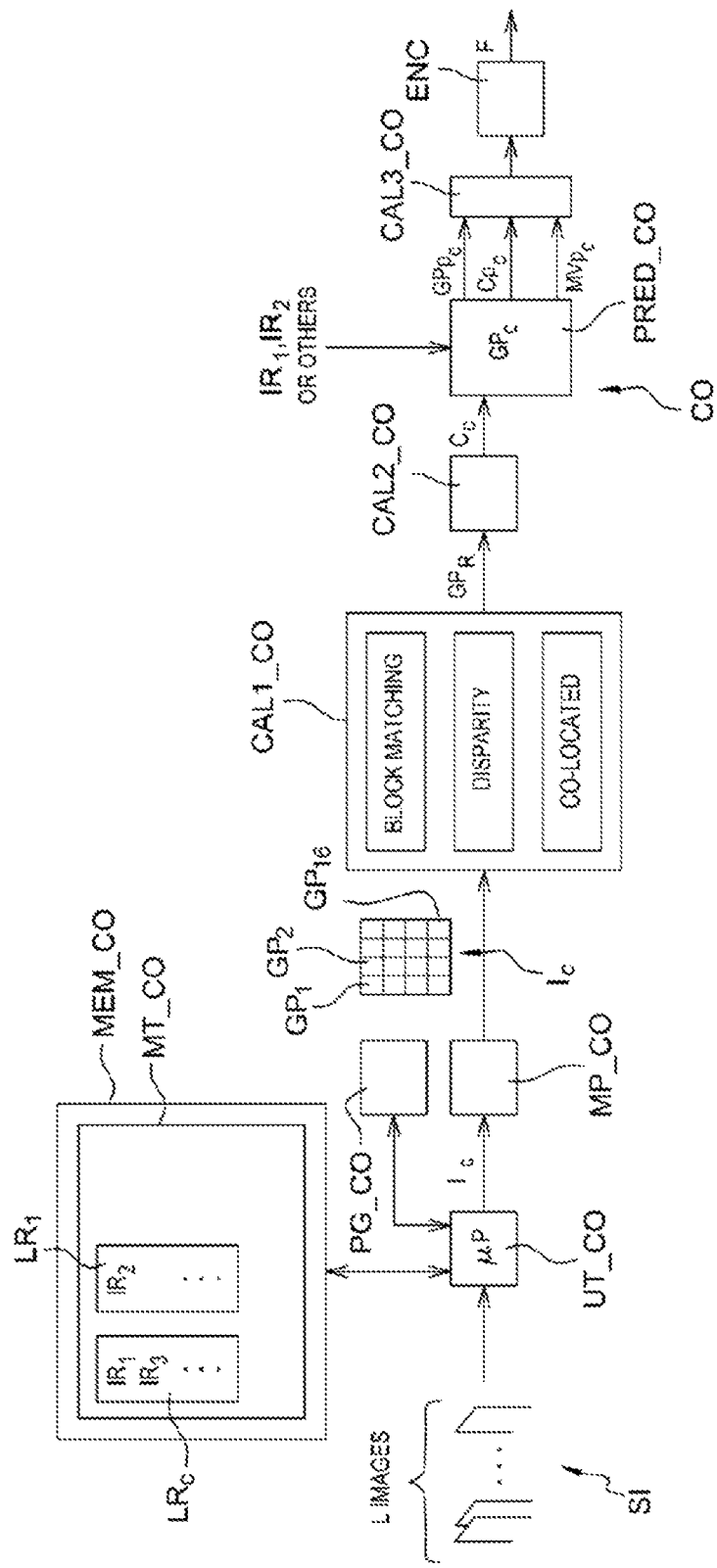
FIG. 2 represents an embodiment of a coding device able to implement the coding method represented in FIG. 1.

According to the embodiment of the invention, the coding method according to the invention is implemented in a coding device CO represented in FIG. 2.

As illustrated in FIG. 2, such a coding device comprises a memory MEM_CO comprising a buffer memory MT_CO, a processing unit UT_CO equipped for example with a microprocessor µP and driven by a computer program PG_CO which implements the coding method according to the invention. On initialization, the code instructions of the computer program PG_CO are for example loaded into a RAM memory (not represented) before being executed by the processor of the processing unit UT_CO.

Figure 1:
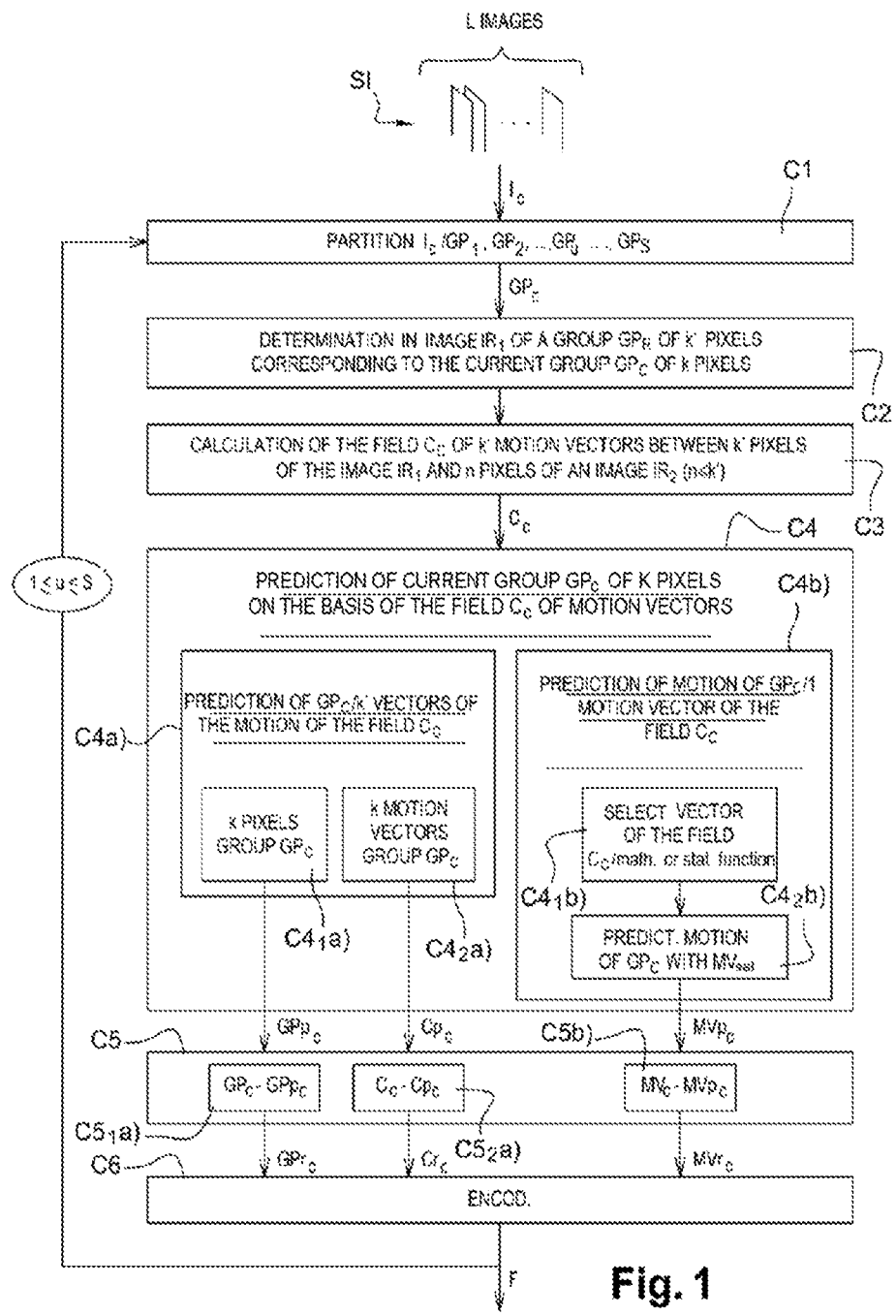
FIG. 1 represents the steps of the coding method according to the invention.

The coding method represented in FIG. 1 applies to any current image $I_C$ of a sequence SI of L images to be coded ($L \geq 1$).

For this purpose, a current image $I_C$ is considered in the sequence of images SI.

In the case where the video coding is of 2D type, the current image $I_C$ is two-dimensional and arises from one and the same camera.

In the case where the video coding is of 3D type:
the current image $I_C$ is a view considered from among several views representing one and the same scene at the same instant and each arising from various cameras oriented according to different viewpoints,
the current image $I_C$ is a texture component or a depth component,
etc. . . .

In the course of a first step C1 represented in FIG. 1, there is undertaken the partitioning of the current image $I_C$ into a plurality of groups of pixels $GP_1, GP_2, \ldots, GP_u, \ldots, GP_S$ ($1 \leq u \leq S$). Such a partitioning is performed by a partitioning software module MP_CO represented in FIG. 2, which module is driven by the microprocessor µP of the processing unit UT_CO.

Such a partitioning module uses for example a scheme for choosing by exhaustive competition or else a scheme for choosing with the aid of an algorithm with a-priori. Such schemes are well known to the person skilled in the art (cf: G. J. Sullivan and T. Wiegand, "Rate-distortion optimization for video compression", *IEEE Signal Proc. Mag.*, pp. 74-90, 1998). They will not therefore be described further on.

The various types of possible partitioning algorithms are grouped together in a database (not represented) of the coder CO. They make it possible to obtain a cutting of the current image into a plurality of groups of pixels which do not necessarily have the same size and/or the same shape. Such groups of pixels can have a rectangular or square shape, or else other geometric shapes, such as for example substantially linear shapes or else entirely arbitrary shapes.

Such groups of pixels can also correspond to zones or objects of the current image.

In the example represented in FIG. 2, the current image $I_C$ is for example partitioned into sixteen groups of k pixels $GP_1, GP_2, \ldots, GP_{16}$, with for example k=16. Said groups of pixels obtained all have for example the shape of a square block and are all of the same size.

In the course of a step C2 represented in FIG. 1, there is undertaken the determination, in a first image $IR_1$ different from the current image $I_C$, of a group $GP_R$ of k' pixels (k'≤k) corresponding to a current group $GP_C$ of k pixels to be coded of the current image $I_C$.

It is assumed that in the example represented, k'=k. Consequently, the groups of pixels $GP_C$ and $GP_R$ are blocks of sixteen pixels.

In the example represented, the first image $IR_1$ is an image of the sequence of images SI which has already been coded and then decoded, said first image belonging to a list of available reference images with a view to the prediction of the pixels or of the motion of the current image $I_C$. Such a list, denoted $LR_C$ in FIG. 2, is stored in the buffer memory MT_CO of the coder CO. In the example represented where the coding is of HEVC type, the buffer memory MT_CO is a DPB ("Decoded Picture Buffer") memory.

In the example represented in FIG. 2, said determination step is implemented by a calculation software module CAL1_CO which is driven by the microprocessor µP of the processing unit UT_CO.

According to a first embodiment, in the case equally of a video coding of 2D type or of 3D type of the current image $I_C$, the determination step C2 consists in selecting from the first image $IR_1$ a group $GP_R$ of k' pixels which is as similar as possible to the current group $GP_C$ of k pixels:
either by means of a conventional criterion of block matching carried out in the pixel domain,
or by searching in the first image $IR_1$ for a co-located block $GP_R$ which is situated in the same position as the current block.

According to a second embodiment, in the case solely of a 3D coding of the current image $I_C$, the determination step C2 consists in determining the k' pixels of the first image $IR_1$ either as a group of pixels which is pointed at by a single disparity vector for the disparity between the current image $I_C$ and the first image $IR_1$, or as a group of k' pixels whose k' pixels are pointed at respectively by vectors of a field of disparity vectors for the disparity between the current image $I_C$ and the first image $IR_1$.

In the course of a step C3 represented in FIG. 1, there is undertaken the calculation of a field $C_C$ of k' motion vectors between each of the k' pixels of the group of pixels $GP_R$ of the first image $IR_1$ and n pixels (n≤k') of at least one second image $IR_2$ different from the current image. The second image $IR_2$ is an image which has already been coded and then decoded and which belongs for example to a list of reference images of the first image $IR_1$. Such a list, denoted $LR_1$ in FIG. 2, is stored in the buffer memory MT_CO of the coder CO.

On completion of the calculation step C3, a dense field $C_C$ of motion vectors is then obtained, in the sense that the n pixels of the second image $IR_2$ which are pointed at by the k' motion vectors of the field $C_C$ are not necessarily contiguous.

In a particular embodiment, n=k', that is to say that the k' motion vectors of the field $C_C$ point respectively toward k' different pixels of the second image $IR_2$.

As a variant, n<k', that is to say that two or more pixels of the second image $IR_2$ are pointed at by one and the same motion vector from among the k' vectors of the field $C_C$.

Such a calculation step C3 is performed by a calculation software module CAL2_CO represented in FIG. 2, which module is driven by the microprocessor μP of the processing unit UT_CO.

The field $C_C$ of motion vectors which is thus calculated is then added to a list of candidate predictors so as to be used with a view to the prediction of the pixels or of the motion of the current group $GP_C$ of k pixels.

In the course of a step C4 represented in FIG. 1, there is undertaken the prediction of the pixels or of the motion of the current group $GP_C$ of k pixels on the basis of the field $C_C$ of k' motion vectors which was calculated in step C3, if the latter field has been selected from the list as optimal predictor. In a manner known per se, such a selection follows from a comparison of the various predictors of the aforementioned list according to a coding performance criterion such as for example the bitrate-distortion criterion well known to the person skilled in the art. Such a criterion is expressed by equation (1) hereinbelow:

$$J=D+\lambda R \quad (1)$$

where:
D represents the distortion between the current group $GP_C$ of k pixels and the reconstructed current group of k pixels,
λ represents a Lagrange multiplier,
R represents the cost in bits of the coding of the index of the predictor considered in the list of candidate predictors and optionally of the k residuals of motion vectors if a motion prediction has been implemented.

The prediction of the pixels or of the motion of the current group $GP_C$ of k pixels is performed by inheritance of the field $C_C$ of k' motion vectors which points according to case:
either to said first image $IR_1$,
or to said second image $IR_2$,
or to an image different from the current image $I_C$ and from said first and second images $IR_1$ and $IR_2$. This other image is for example an image $IR_3$ which has already been coded and then decoded and which belongs to the list $LR_C$ of reference images which is represented in FIG. 2.

The various alternatives proposed in step C4 depend on the envisaged application and on the envisaged context of video coding. The choice of the first image, of the second image or of another image for the prediction is predetermined at the coder CO.

In the case where the choice for the prediction of the pixels or of the motion rests on a reference image different from the first or from the second image, it could for example be determined that this reference image is such that it complies with the same temporal distance with the current image $I_C$ as the temporal distance separating the first image $IR_1$ and the second image $IR_2$. It could also be determined that this reference image is always the first image contained in the list $LR_C$ of reference images which is stored in the buffer memory MT_CO of the coder CO such as represented in FIG. 2.

On completion of step C4, a predictor group $GP_C$ of k pixels of the current group $GP_C$ of pixels is delivered.

Such a prediction step C4 is performed by a prediction software module PRED_CO represented in FIG. 2, which module is driven by the microprocessor μP of the processing unit UT_CO.

As illustrated in FIG. 1, step C4 of predicting the pixels or the motion of the current group $GP_C$ of k pixels comprises two options C4a) and C4b).

In the first option C4a), k' motion vectors of the field of motion vectors Cc are used to predict both the texture and the motion of the current group $GP_C$ of k pixels.

In the second option C4b), a single motion vector chosen from among the k' motion vectors of the field of motion vectors Cc is used to predict solely the motion of the current group $GP_C$ of k pixels.

Option C4a) (FIG. 1)

In the case of a texture prediction, in the course of a step $C4_1a$), the k pixels of said current group $GP_C$ of pixels are predicted by n pixels of the first image, of the second image or of another reference image, said n pixels being pointed at respectively by the k' motion vectors of said calculated field $C_C$ of motion vectors.

In the case where n=k, the k pixels of said current group $GP_C$ of pixels are predicted respectively by n different pixels.

In the case where n<k, at least two pixels of the current group $GP_C$ of pixels are predicted with the aid of one and the same pixel from among the n pixels.

Subsequent to step $C4_1a$), a current predictor group $GPp_C$ of k pixels is obtained.

In the case of a motion prediction, in the course of a step $C4_2a$), k motion vectors associated respectively with the k pixels of said current group $GP_C$ of pixels are predicted by the k' motion vectors of said calculated field $C_C$ of motion vectors.

In the case where k'=k, the k motion vectors associated with the current group $GP_C$ of pixels are predicted respectively by k' different motion vectors of said calculated field $C_C$ of motion vectors.

In the case where k'<k, at least two of the k motion vectors associated with the current group $GP_C$ of pixels are predicted by one and the same motion vector from among the k' motion vectors of said calculated field $C_C$ of motion vectors.

Subsequent to step $C4_2a$), a predictor field $Cp_C$ of k motion vectors is obtained.

Option C4b) (FIG. 1)

The option C4b) comprises:
a step C41b) of selecting a motion vector from among the k' motion vectors of said calculated field $C_C$ of motion vectors, by means of a mathematical or statistical function, delivering a selected motion vector $MV_{sel}$,
a step C42b) of predicting a single motion vector $MV_C$ of the current group of pixels with the aid of said selected motion vector $MV_{sel}$.

Subsequent to step C42b), a predictor motion vector $MVp_C$ is obtained.

Examples of mathematical or statistical functions are cited hereinbelow:
  mean of the k' motion vectors of the field $C_C$,
  median of the k' motion vectors of the field $C_C$,
  predetermined coding performance criterion, such as for example the aforementioned bitrate-distortion criterion,
  etc. . . .

In the course of a step C5 represented in FIG. 1, there is undertaken the calculation of the residual data by comparing the prediction data obtained in step C4 with the data of the current group $GP_C$ of pixels.

Such a calculation step C5 is performed by a calculation software module CAL3_CO represented in FIG. 2, which module is driven by the microprocessor μP of the processing unit UT_CO.

In the case where it is step $C4_1a$) which has been implemented, there is undertaken, in the course of a step $C5_1a$), the obtaining of a current residual group $GPr_C$ of k pixels by calculating the difference between the current group $GP_C$ of k pixels and the predictor group $GPp_C$ of k pixels.

In the case where it is step $C4_2a$) which has been implemented, there is undertaken, in the course of a step $C5_2a$), the obtaining of a current residual field $Cr_C$ of k motion vectors by calculating the difference between the k motion vectors associated respectively with the k pixels of the current group $GP_C$ of pixels and the k motion vectors of the predictor field $Cp_C$ of motion vectors.

In the case where it is step C4b) which has been implemented, there is undertaken, in the course of a step C5b), the obtaining of a current residual motion vector $MVr_C$ by calculating the difference between the single motion vector $MV_C$ associated with the current group $GP_C$ of pixels and the predictor motion vector $MVp_C$.

In the course of a step C6 represented in FIG. 1, as a function of the chosen prediction options, there is undertaken the encoding either of the current residual group $GPr_C$ of k pixels, or of the current residual field $Cr_C$ of k motion vectors, or of the current residual motion vector $MVr_C$. A data stream F is then delivered on completion of step C6.

Such an encoding step C6 is performed by an encoder ENC such as represented in FIG. 2, which is for example compliant with the HEVC standard. The encoder ENC is driven by the microprocessor μP of the processing unit UT_CO.

The coding steps C1 to C6 are repeated for the set of groups of pixels $GP_1, GP_2, \ldots, GP_u, \ldots, GP_S$.

In accordance with the invention, the data stream F advantageously does not contain data relating to the field $C_C$ of motion vectors which was calculated in the aforementioned step C3, since these data are associated with groups of pixels already coded and then decoded and therefore available to the decoder. It is therefore needless to transmit these data in the data stream F which optionally contains residual data, if they exist, of motion or of pixels.

The data stream F is thereafter transmitted by means of a transmission interface (not represented) of the coder CO, via a communication network, to a remote terminal. The latter comprises a decoding device DO such as represented in FIG. 3.

Detailed Description of the General Principle of the Decoding Part

A general embodiment of the invention will now be described, in which the decoding method according to the invention is used to decode an image or a sequence of images coded in a binary stream close to that obtained by a decoding according to the HEVC standard. In this embodiment, the decoding method according to the invention is for example implemented in a software or hardware manner by modifications of a decoder initially compliant with the HEVC standard. The decoding method according to the invention is represented in the form of an algorithm comprising steps D1 to D6 represented in FIG. 4.

Figure 3:
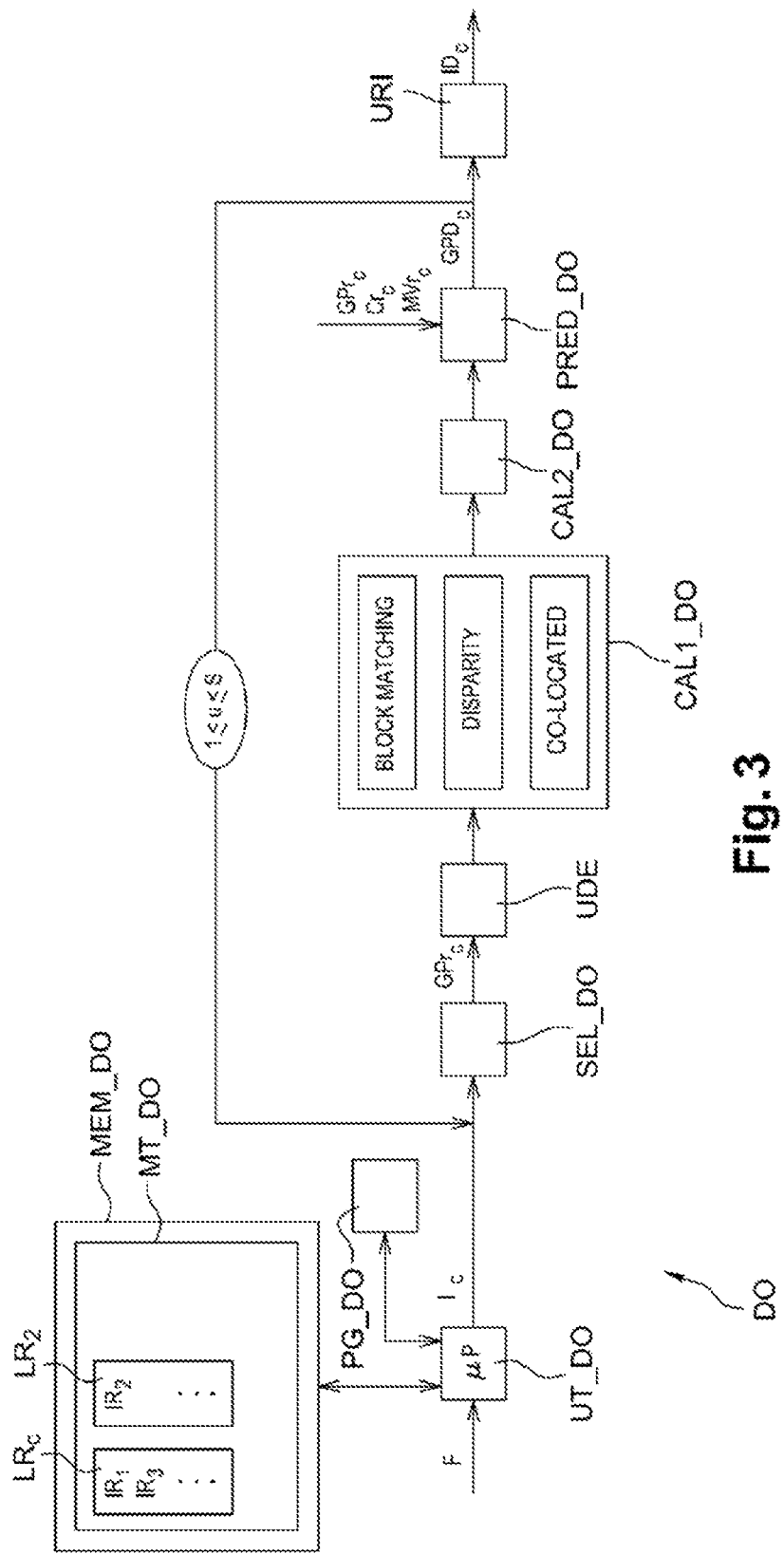
FIG. 3 represents an embodiment of a decoding device according to the invention.

According to the embodiment of the invention, the decoding method according to the invention is implemented in the decoding device DO represented in FIG. 3.

As illustrated in FIG. 3, such a decoding device DO comprises a memory MEM_DO comprising a buffer memory MT_DO, a processing unit UT_DO equipped for example with a microprocessor μP and driven by a computer program PG_DO which implements the decoding method according to the invention. On initialization, the code instructions of the computer program PG_DO are for example loaded into a RAM memory (not represented) before being executed by the processor of the processing unit UT_DO.

Figure 4:
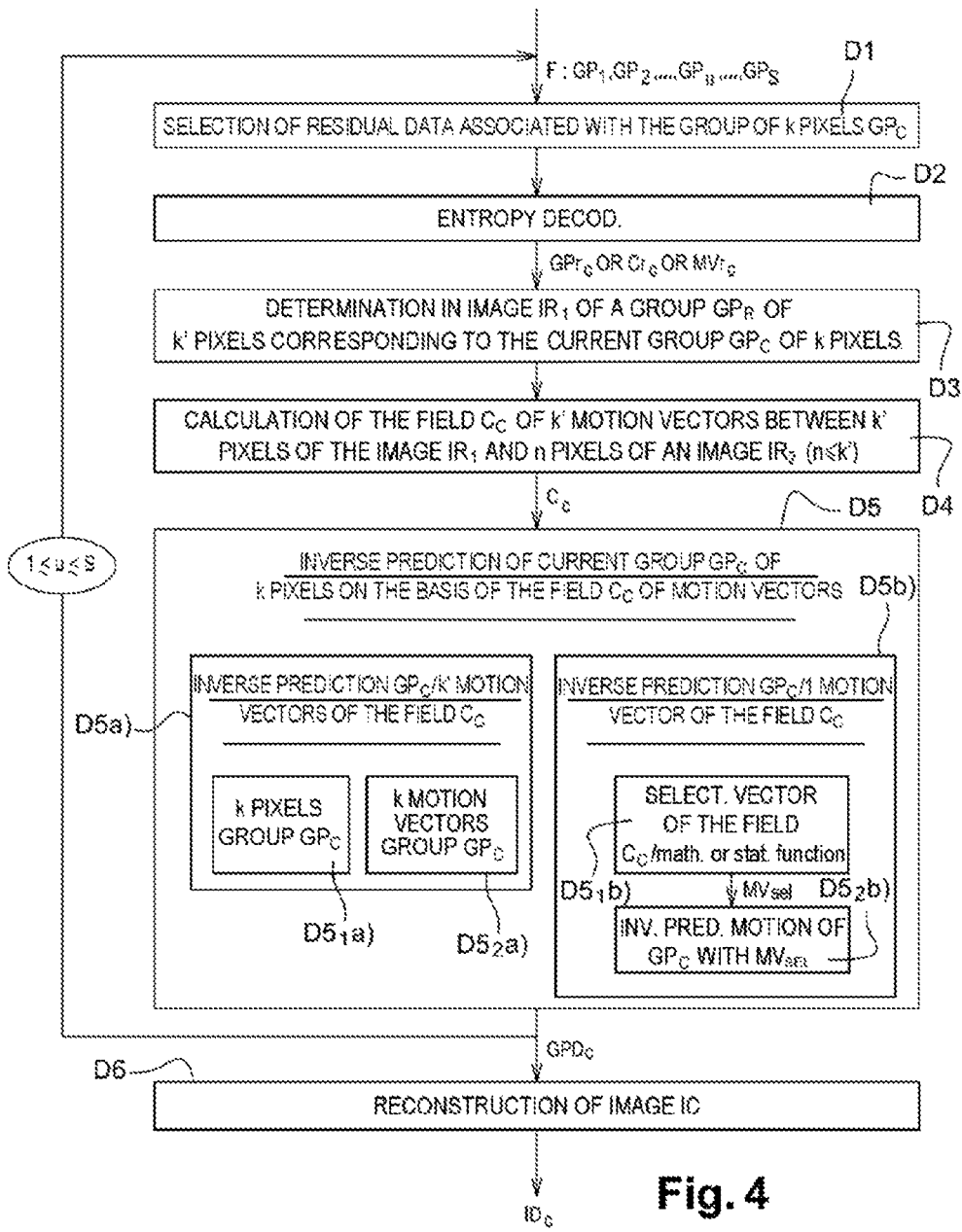
FIG. 4 represents the steps of a decoding method able to be implemented in the decoding device represented in FIG. 3, FIGS. 5A to 5K represent embodiments of the coding and decoding method according to the invention.

The decoding method represented in FIG. 4 applies to any current image $I_C$ of a sequence SI of L images to be decoded (L≥1).

For this purpose, a current image $I_C$ to be decoded is considered in the sequence of images SI.

In the case where the decoding used is of 2D type, the current image $I_C$ is two-dimensional and arises from one and the same camera.

In the case where the decoding used is of 3D type:
  the current image $I_C$ is a view considered from among several views representing one and the same scene at the same instant and each arising from various cameras oriented according to different viewpoints,
  the current image $I_C$ is a texture component or a depth component,
  etc. . . . .

For this purpose, information representative of the current image $I_C$ to be decoded is conventionally identified in the stream F received at the decoder DO.

In the course of a step D1 represented in FIG. 4, there is undertaken the selection, in the stream F, of a current group $GPr_C$ of k pixels to be decoded from among the S groups of pixels $GP_1, GP_2, \ldots, GP_u, \ldots, GP_S$ (1≤u≤S) to be decoded which are contained in the stream F.

With reference to FIG. 3, said selection step D1 is implemented by a selection module SEL_DO of the decoder DO, which module is driven by the microprocessor μP of the processing unit UT_DO.

In the course of a step D2 represented in FIG. 4, there is undertaken the entropy decoding of the current encoded residual data $GPr_C$, $Cr_C$, or $MVr_C$ associated with the current group $GP_C$ of k pixels to be decoded, by reading the stream F with the aid of a stream pointer.

More precisely, these encoded residual data are decoded by an entropy decoding unit UDE such as represented in FIG. 3, said unit being driven by the microprocessor μP of the processing unit UT_DO. Such a unit is well known as such and will not be described further on.

In the course of a step D3 represented in FIG. 4, there is undertaken the determination, in a first image $IR_1$ different from the current image $I_C$ to be decoded, of a group $GP_R$ of k' pixels corresponding to the current group $GP_C$ of k pixels to be decoded of the current image $I_C$.

It is assumed that in the example represented, k'=k. Consequently, the groups of pixels $GP_C$ and $GP_R$ are blocks of sixteen pixels.

In the example represented, the first image $IR_1$ is an image of the sequence of images SI which has already been decoded, said first image belonging to a list of reference images which is available with a view to the inverse prediction of the pixels or of the motion of the current image $I_C$. Such a list, denoted $LR_C$ in FIG. 3, is stored in the buffer memory MT_DO of the decoder DO. In the example represented where the decoding is of HEVC type, the buffer memory MT_DO is a DPB ("Decoded Picture Buffer") memory.

In the example represented in FIG. 3, said determination step is implemented by a calculation software module CAL1_DO which is driven by the microprocessor µP of the processing unit UT_DO.

Such a step is identical to the determination step C2 which was described hereinabove in conjunction with the coding method. Consequently, the determination step D3 will not be described at greater length.

In the course of a step D4 represented in FIG. 4, there is undertaken the calculation of a field $C_C$ of k' motion vectors between each of the k' pixels of the group of pixels $GP_R$ of the first image $IR_1$ and respectively n pixels (n≤k') of at least one second image $IR_2$ different from the current image. The second image $IR_2$ is an image which has already been decoded and which belongs for example to a list of reference images of the first image $IR_1$. Such a list, denoted $LR_1$ in FIG. 3, is stored in the buffer memory MT_DO of the decoder DO.

On completion of the calculation step D4, a dense field Cc of motion vectors is then obtained, in the sense that the n pixels of the second image $IR_2$ which are pointed at by the k' motion vectors of the field $C_C$ are not necessarily contiguous.

In a particular embodiment, n=k', that is to say that the k' motion vectors of the field $C_C$ point respectively toward k' different pixels of the second image $IR_2$.

As a variant, n<k', that is to say that two or more pixels of the second image $IR_2$ are pointed at by one and the same motion vector from among the k' vectors of the field $C_C$.

Such a calculation step D4 is performed by a calculation software module CAL2_DO represented in FIG. 3, which module is driven by the microprocessor µP of the processing unit UT_DO.

The field $C_C$ of motion vectors which is thus calculated is then added to a list of candidate predictors so as to be used with a view to the inverse prediction of the pixels or of the motion of the current group $GP_C$ of k pixels to be decoded.

The aforementioned calculation step D4 is in every respect identical to the calculation step C3 performed on coding. For this reason, the calculation step D4 will not be described at greater length.

In the course of a step D5 represented in FIG. 4, there is undertaken the inverse prediction of the pixels or of the motion of the current group $GP_C$ of k pixels on the basis of the field $C_C$ of k' motion vectors which was calculated in step D4, if the latter field has been selected from the list as optimal predictor. In a manner known per se, such a selection follows from a comparison of the various predictors of the aforementioned list according to a decoding performance criterion such as for example the bitrate-distortion criterion well known to the person skilled in the art. Such a criterion is expressed by equation (1) hereinbelow:

$$J=D+\lambda R \quad (1)$$

where:
D represents the distortion between the current group $GP_C$ of k pixels and the reconstructed current group of k pixels,
λ represents a Lagrange multiplier,
R represents the cost in bits of the coding of the index of the predictor considered in the list of candidate predictors and optionally of the k residuals of motion vectors if a motion prediction has been implemented.

The inverse prediction of the pixels or of the motion of the current group $GP_C$ of k pixels is performed by inheritance of the field $C_C$ of k' motion vectors which points according to case:
either to said first image $IR_1$,
or to said second image $IR_2$,
or to an image different from the current image $I_C$ and from said first and second images $IR_1$ and $IR_2$. This other image is for example an image $IR_3$ which has already been decoded and which belongs to the list of reference images $LR_C$ which is represented in FIG. 3.

The various alternatives proposed in step D5 depend on the envisaged application and on the envisaged context of video decoding. The choice of the first image, of the second image or of another image for the prediction is predetermined at the decoder DO.

In the case where the choice for the inverse prediction of the pixels or of the motion rests on a reference image different from the first or from the second image, it could for example be determined that this reference image is such that it complies with the same temporal distance with the current image $I_C$ as the temporal distance separating the first image $IR_1$ and the second image $IR_2$. It could also be determined that this reference image is always the first image contained in the list LR of reference images which is stored in the buffer memory MT_DO of the decoder DO such as represented in FIG. 3.

On completion of step D5, a reconstructed current group $GP_C$ of k pixels is delivered.

Such a prediction step D5 is performed by a prediction software module PRED_DO represented in FIG. 3, which module is driven by the microprocessor µP of the processing unit UT_DO.

As illustrated in FIG. 4, step D5 of predicting the pixels or the motion of the current group $GP_C$ of k pixels to be decoded comprises two options D5a) and D5b).

In the first option D5a), k' motion vectors of the field of motion vectors $C_C$ are used to reconstruct both the texture and the motion of the current group $GP_C$ of k pixels to be decoded.

In the second option D5b), a single motion vector chosen from among the k' motion vectors of the field of motion vectors $C_C$ is used to reconstruct solely the motion of the current group $GP_C$ of k pixels.

Option D5a) (FIG. 4)

In the case of an inverse prediction of texture, in the course of a step $D5_1a$), there is undertaken the reconstruction of the k pixels of said current group $GP_C$ of pixels on the basis:
of n pixels of the first image, of the second image or of another reference image, said n corresponding pixels being pointed at respectively by the k' motion vectors of said calculated field $C_C$ of motion vectors,
and of the current residual group of pixels $GPr_C$ which was determined in step D2.

In the case where n=k, the k pixels of said current group $GP_C$ of pixels are reconstructed respectively by n different pixels.

In the case where n<k, at least two pixels of the current group $GP_C$ of pixels are reconstructed with the aid of one and the same pixel from among the n pixels.

Subsequent to step D5$_1$a), a current decoded group $GPD_C$ of k pixels is reconstructed.

In the case of an inverse prediction of motion, in the course of a step D5$_2$a), there is undertaken the reconstruction of k motion vectors associated respectively with the k pixels of said current group of pixels, on the basis of the k' motion vectors of said field of motion vectors which is obtained $C_C$ and of said determined current residual field of motion vectors $Cr_C$ which is obtained in step D2.

In the case where k'=k, the k motion vectors associated with the current group $GP_C$ of pixels are reconstructed on the basis respectively of k' different motion vectors of said calculated field $C_C$ of motion vectors.

In the case where k'<k, at least two of the k motion vectors associated with the current group $GP_C$ of pixels are reconstructed on the basis of one and the same motion vector from among the k' motion vectors of said calculated field $C_C$ of motion vectors.

Subsequent to step D5$_2$a), a current field $C_C$ of k motion vectors is reconstructed, thereby making it possible to reconstruct a current decoded group $GPD_C$ of k pixels.

Option D5b) (FIG. 4)

The option D5b) comprises:
a step D5$_1$b) of selecting a motion vector from among the k motion vectors of said calculated field Cc of motion vectors, by means of a mathematical or statistical function, delivering a selected motion vector $MV_{sel}$,
a step D52b) of inverse prediction of motion of the current group of pixels with the aid of said selected motion vector $MV_{sel}$.

Said inverse prediction step D52b) consists in reconstructing a motion vector associated with the current group of pixels $GP_C$ with the aid of said selected motion vector $MV_{sel}$ and of the current residual motion vector $MV_r$ determined in step D2.

Said reconstructed motion vector thus makes it possible to reconstruct a current decoded group $GPD_C$ of k pixels.

Examples of mathematical or statistical functions were cited above in the description in conjunction with the selection step C41b).

The decoding steps D1 to D5 which have just been described hereinabove are implemented again for the S groups of pixels $GP_1, GP_2, \ldots, GP_u, \ldots, GP_S$ (1≤u≤S) of the current image $I_C$ to be decoded which are contained in the stream F.

With reference to FIG. 4, there is undertaken, in the course of a step D6, the reconstruction of a decoded current image $ID_C$.

With reference to FIG. 3, the reconstruction step D6 is implemented by a reconstruction unit URI which writes the groups of pixels decoded in the decoded image $ID_C$ as these groups of pixels become available. Said unit is driven by the microprocessor µP of the processing unit UT_DO.

Detailed Description of Various Embodiments of the Coding/Decoding Method

With reference to FIGS. 5A to 5K, we shall now describe various possible embodiments in accordance with the invention. These embodiments can be implemented both when coding and when decoding.

Figure 5A:
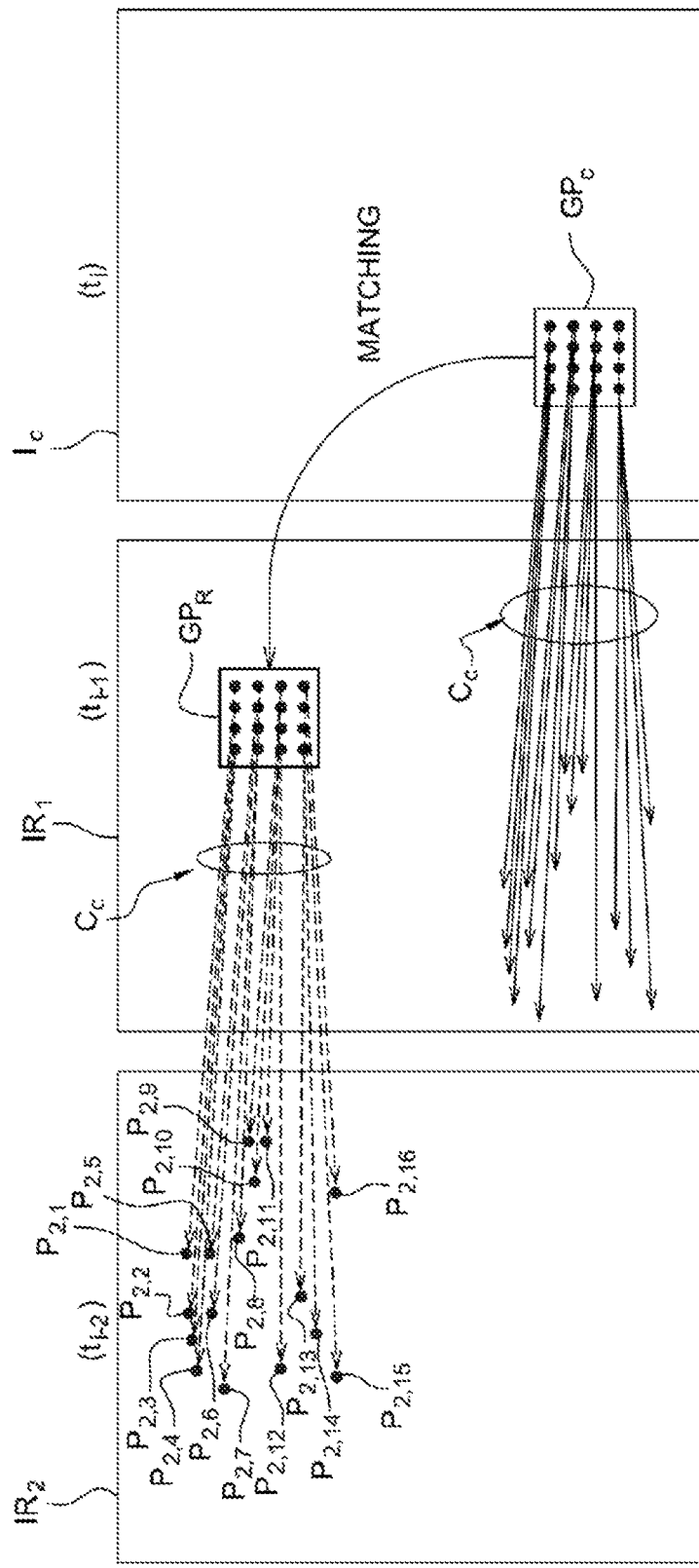

In the example illustrated in FIG. 5A:
the current image $I_C$ is a two-dimensional image situated at a current instant $t_i$,
the first image $IR_1$ is a two-dimensional image situated at an instant $t_{i-1}$ which immediately precedes the current instant $t_i$,
the second image $IR_2$ is a two-dimensional image situated at an instant $t_{i-2}$ which immediately precedes the instant $t_{i-1}$.

In the course of the aforementioned step $C_2$ or $D_3$, the group GPr of sixteen pixels corresponding, in the first image $IR_1$, to the current group of pixels $GP_C$ is determined conventionally, for example by means of the "block matching" technique.

In the course of the aforementioned step C3 or D4, there is undertaken the calculation of the dense field $C_C$ of sixteen motion vectors between each of the sixteen pixels of the group of pixels $GP_R$ of the first image $IR_1$ and respectively SIXTEEN PIXELS $P_{2,1}, P_{2,2}, P_{2,3}, P_{2,4}, P_{2,5}, P_{2,6}, P_{2,7}, P_{2,8}, P_{2,9}, P_{2,10}, P_{2,11}, P_{2,12}, P_{2,13}, P_{2,14}, P_{2,15}, P_{2,16}$ belonging to the second image $IR_2$ different from the current image.

In the course of the aforementioned step C4 or D5, there is undertaken the prediction of the pixels or of the motion of the current group $GP_C$ of sixteen pixels on the basis of the field $C_C$ of sixteen motion vectors which was calculated in step C3 or D4.

Such a prediction consists for example in predicting the sixteen motion vectors (not represented) associated respectively with the sixteen pixels of the current group $GP_C$ of pixels by means respectively of the sixteen motion vectors making up the field $C_C$.

Figure 5B:
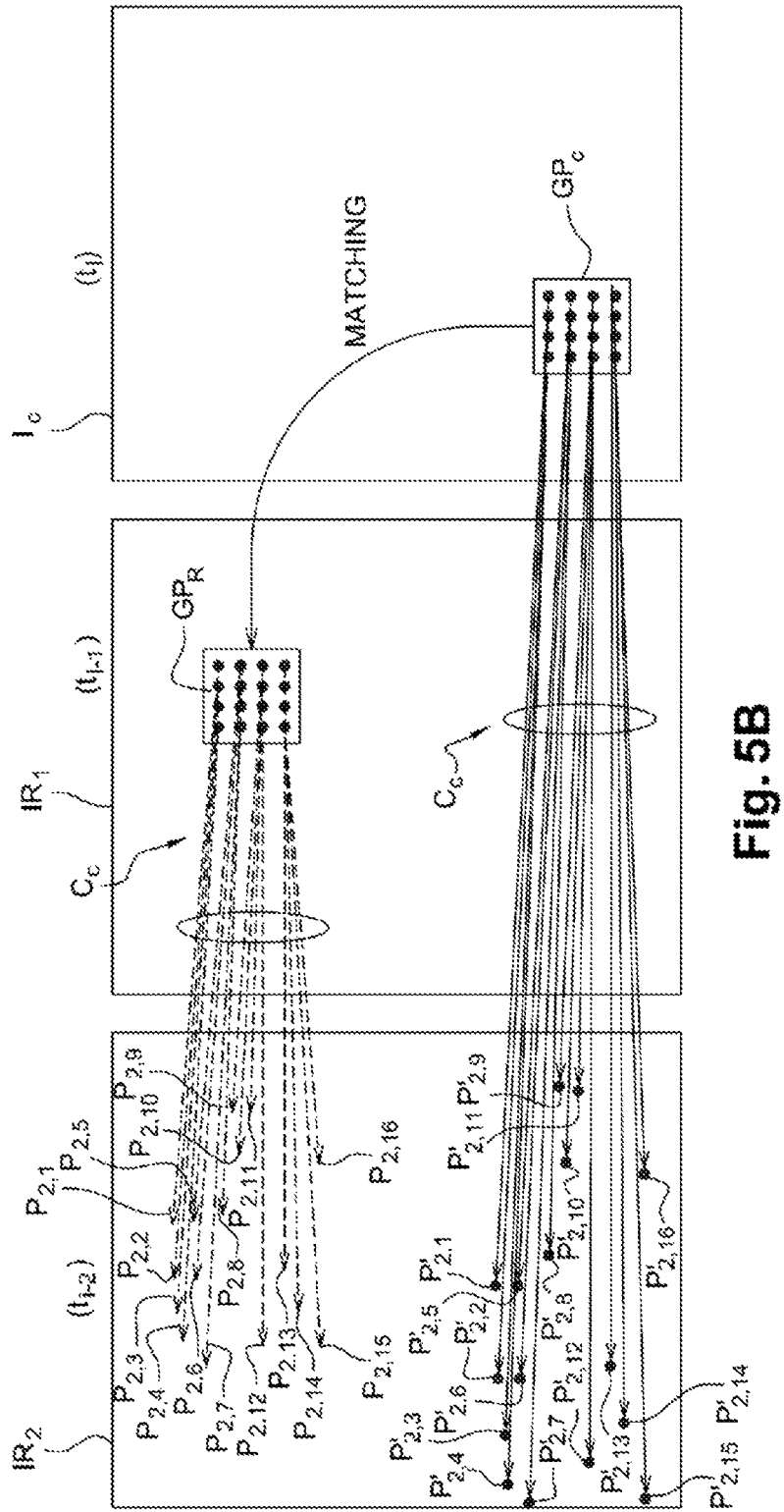

In the example illustrated in FIG. 5B:
the current image $I_C$ is a two-dimensional image situated at a current instant $t_i$,
the first image $IR_1$ is a two-dimensional image situated at an instant $t_{i-1}$ which immediately precedes the current instant $t_i$,
the second image $IR_2$ is a two-dimensional image situated at an instant $t_{i-2}$ which immediately precedes the instant $t_{i-1}$.

In the course of the aforementioned step C2 or D3, the group $GP_R$ of sixteen pixels corresponding, in the first image $IR_1$, to the current group $GP_C$ is determined conventionally, for example by means of the "block matching" technique.

In the course of the aforementioned step C3 or D4, there is undertaken the calculation of the dense field $C_C$ of sixteen motion vectors between each of the sixteen pixels of the group of pixels $GP_R$ of the first image $IR_1$ and respectively sixteen pixels $P_{2,1}, P_{2,2}, P_{2,3}, P_{2,4}, P_{2,5}, P_{2,6}, P_{2,7}, P_{2,8}, P_{2,9}, P_{2,10}, P_{2,11}, P_{2,12}, P_{2,13}, P_{2,14}, P_{2,15}, P_{2,16}$ belonging to the second image $IR_2$ different from the current image.

In the course of the aforementioned step C4 or D5, there is undertaken the prediction of the pixels or of the motion of the current group $GP_C$ of sixteen pixels on the basis of the field $C_C$ of sixteen motion vectors which was calculated in step C3 or D4.

Such a prediction consists for example in predicting the sixteen pixels of the current group $GP_C$ of pixels by means respectively of the sixteen pixels $P'_{2,1}, P'_{2,2}, P'_{2,3}, P'_{2,4}, P'_{2,5}, P'_{2,6}, P'_{2,7}, P'_{2,8}, P'_{2,9}, P'_{2,10}, P'_{2,11}, P'_{2,12}, P'_{2,13}, P'_{2,14}, P'_{2,15}, P'_{2,16}$ of the image $IR_2$ which are pointed at respectively by the sixteen motion vectors of the field $C_C$.

For this purpose, there is undertaken a calibration of these sixteen motion vectors since the temporal distance between the current image $I_C$ and the second image $IR_2$ is different from the temporal distance separating the first image $IR_1$ from the second image $IR_2$. In the example illustrated in FIG. 5C, the video coding is of 3D type and each image to be coded in the sequence of images SI is a multi-view image which may be for example in the MVV (for "Multiview Video") format or in the MVD (for "Multiview Video+ Depth") format. At a current instant $t_i$, a multi-view image $IMV_i$ comprises T views $V_{1,i}, V_{2,i}, \ldots, V_{w,i}, \ldots V_{T,i}$ where $1 \le w \le T$, each of these views representing one and the same scene according to respectively T different viewpoints.

Figure 5C:
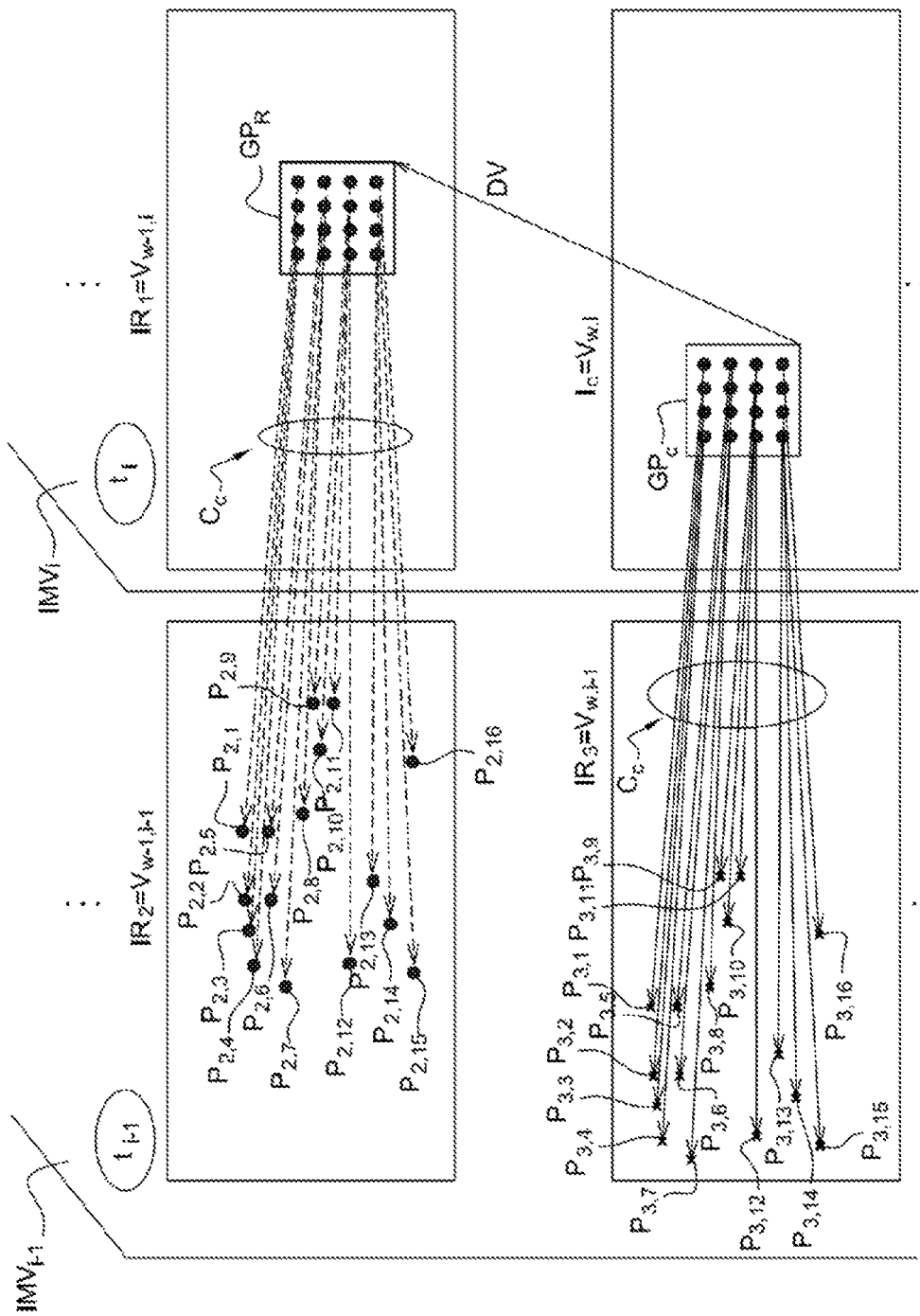

In FIG. 5C:
- the current image $I_C$ is a current view $V_{w,i}$ situated at the current instant $t_i$ in the current multi-view image $IMV_i$,
- the first image $IR_1$ is a view $V_{w-1,i}$ situated at the instant $t_i$, said view being situated immediately above the current view $V_{w,i}$ in the current multi-view image $IMV_i$ and having already been coded and then decoded,
- the second image $IR_2$ is a view $V_{w-1,i-1}$ of a multi-view image $IMV_{i-1}$ which is situated at an instant $t_{i-1}$ immediately preceding the current instant $t_i$,
- a third image $IR_3$ is a view $V_{w,i-1}$ of the multi-view image $IMV_{i-1}$ which is situated at an instant $t_{i-1}$ immediately preceding the current instant $t_i$.

In the course of the aforementioned step C2 or D3, the group $GP_R$ of sixteen pixels corresponding, in the first image $IR_1$, to the current group of pixels $GP_C$ is determined conventionally by a single disparity vector DV for the disparity between the current image $I_C$ and the first image $IR_1$.

In the course of the aforementioned step C3 or D4, there is undertaken the calculation of the dense field $C_C$ of sixteen motion vectors between each of the sixteen pixels of the group of pixels $GP_R$ of the first image $IR_1$ and respectively sixteen pixels $P_{2,1}, P_{2,2}, P_{2,3}, P_{2,4}, P_{2,5}, P_{2,6}, P_{2,7}, P_{2,8}, P_{2,9}, P_{2,10}, P_{2,11}, P_{2,12}, P_{2,13}, P_{2,14}, P_{2,15}, P_{2,16}$ belonging to the second image $IR_2$.

In the course of the aforementioned step C4 or D5, there is undertaken the prediction of the pixels or of the motion of the current group $GP_C$ of sixteen pixels on the basis of the field $C_C$ of sixteen motion vectors which was calculated in step C3 or D4, with respect to said third image $IR_3$. Such a prediction consists for example in predicting the sixteen pixels of the current group $GP_C$ of pixels by means respectively of the sixteen pixels $P_{3,1}, P_{3,2}, P_{3,3}, P_{3,4}, P_{3,5}, P_{3,6}, P_{3,7}, P_{3,8}, P_{3,9}, P_{3,10}, P_{3,11}, P_{3,12}, P_{3,13}, P_{3,14}, P_{3,15}, P_{3,16}$ of the third image $IR_3$ which are pointed at respectively by the sixteen motion vectors of the field $C_C$.

In the example illustrated in FIG. 5D, the video coding is of 3D type and each image to be coded in the sequence of images SI is a multi-view image which may be for example in the MVV or MVD format. At a current instant $t_i$, a multi-view image $IMV_i$ comprises T views $V_{1,i}, V_{2,i}, \ldots, V_{w,i}, \ldots V_{T,i}$ where $1 \le w \le T$, each of these views representing one and the same scene according to respectively T different viewpoints.

In FIG. 5D:
- the current image $I_C$ is a current view $V_{w,i}$ situated at the current instant $t_i$ in the current multi-view image $IMV_i$,
- the first image $IR_1$ is a view $V_{w-1,i}$ situated at the instant $t_i$, said view being situated immediately above the current view $V_{w,i}$ in the current multi-view image $IMV_i$ and having already been coded and then decoded,
- the second image $IR_2$ is a view $V_{w-1,i-1}$ of a multi-view image $IMV_{i-1}$ which is situated at an instant $t_{i-1}$ immediately preceding the current instant $t_i$,
- the third image $IR_3$ is a view $V_{w,i-2}$ of a multi-view image $IMV_{i-2}$ which is situated at an instant $t_{i-2}$ immediately preceding the instant $t_{i-1}$.

In the course of the aforementioned step C2 or D3, the group $GP_R$ of sixteen pixels corresponding, in the first image $IR_1$, to the current group of pixels $GP_C$ is determined conventionally by a single disparity vector DV for the disparity between the current image $I_C$ and the first image $IR_1$.

In the course of the aforementioned step C3 or D4, there is undertaken the calculation of the dense field $C_C$ of sixteen motion vectors between each of the sixteen pixels of the group of pixels $GP_R$ of the first image $IR_1$ and respectively Sixteen pixels $P_{2,1}, P_{2,2}, P_{2,3}, P_{2,4}, P_{2,5}, P_{2,6}, P_{2,7}, P_{2,8}, P_{2,9}, P_{2,10}, P_{2,11}, P_{2,12}, P_{2,13}, P_{2,14}, P_{2,15}, P_{2,16}$ belonging to the second image $IR_2$.

In the course of the aforementioned step C4 or D5, there is undertaken the prediction of the pixels or of the motion of the current group $GP_C$ of sixteen pixels on the basis of the field $C_C$ of sixteen motion vectors which was calculated in step C3 or D4, with respect to said third image $IR_3$. Such a prediction consists for example in predicting the sixteen pixels of the current group $GP_C$ of pixels by means respectively of the sixteen pixels $P_{3,1}, P_{3,2}, P_{3,3}, P_{3,4}, P_{3,5}, P_{3,6}, P_{3,7}, P_{3,8}, P_{3,9}, P_{3,10}, P_{3,11}, P_{3,12}, P_{3,13}, P_{3,14}, P_{3,15}, P_{3,16}$ of the third image $IR_3$ which are pointed at respectively by the sixteen motion vectors of the field $C_C$. For this purpose, there is undertaken a calibration of these sixteen motion vectors since the temporal distance between the current image $I_C$ and the third image $IR_3$ is different from the temporal distance separating the first image $IR_1$ from the second image $IR_2$.

Figure 5E:
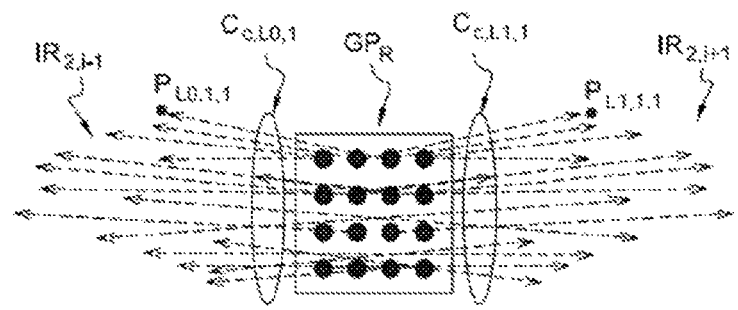

In the example illustrated in FIG. 5E, the video coding is of 2D or 3D type. FIG. 5E represents a group $GP_R$ of sixteen pixels corresponding, in the first image $IR_1$ (not represented), to the current group of pixels $GP_C$ (not represented) of the current image $I_C$ (not represented). The group of pixels $GP_R$ has been obtained in the course of the aforementioned step C2 or D3, for example by means of a single disparity vector DV for the disparity between the current image $I_C$ and the first image $IR_1$.

The embodiment represented in FIG. 5E is distinguished from the previous embodiments by the fact that in the course of the aforementioned step C3 or D4, there is undertaken the calculation of two dense fields $C_{C,L0,1}$ and $C_{C,L1,1}$ each containing sixteen motion vectors.

The field $C_{C,L0,1}$ is calculated between each of the sixteen pixels of the group of pixels $GP_R$ of the first image $IR_1$ and respectively sixteen pixels $P_{L0,1,1}, P_{L0,1,2}, P_{L0,1,3}, P_{L0,1,4}, P_{L0,1,5}, P_{L0,1,6}, P_{L0,1,7}, P_{L0,1,8}, P_{L0,1,9}, P_{L0,1,10}, P_{L0,1,11}, P_{L0,1,12}, P_{L0,1,13}, P_{L0,1,14}, P_{L0,1,15}, P_{L0,1,16}$ belonging to a second image $IR_{2,i+1}$ which is for example situated at an instant $t_{i+1}$ which immediately precedes the instant $t_i$ at which the current image $I_C$ is coded. For purposes of simplicity of FIG. 5E, only the pixel $P_{L0,1,1}$ is represented.

The field $C_{C,L1,1}$ is calculated between each of the sixteen pixels of the group of pixels $GP_R$ of the first image $IR_1$ and respectively sixteen pixels $P_{L1,1,1}, P_{L1,1,2}, P_{L1,1,3}, P_{L1,1,4}, P_{L1,1,5}, P_{L1,1,6}, P_{L1,1,7}, P_{L1,1,8}, P_{L1,1,9}, P_{L1,1,10}, P_{L1,1,11}, P_{L1,1,12}, P_{L1,1,13}, P_{L1,1,14}, P_{L1,1,15}, P_{L1,1,16}$ belonging to another second image $IR_{2,i+1}$ which is situated at an instant $t_{i+1}$ which immediately follows the instant $t_i$ at which the current image $I_C$ is coded. For purposes of simplicity of FIG. 5E, only the pixel $P_{L1,1,1}$ is represented.

The two fields of motion vectors $C_{C,L0,1}$ and $C_{C,L1,1}$ thus calculated form a predictor which is added to a list of candidate predictors so as to be used with a view to the prediction of the current group $GP_C$ of k pixels.

In the course of the aforementioned step C4 or D5, there is undertaken the prediction of the pixels or of the motion of the current group $GP_C$ of sixteen pixels on the basis of the two fields of motion vectors $C_{C,L0,1}$ and $C_{C,L1,1}$ thus calculated instead of a single field as has been described previously for the other embodiments.

The prediction of the pixels or of the motion of the current group $GP_C$ of sixteen pixels is therefore implemented with respect:
- to the field $C_{C,L0,1}$, the vectors of this field pointing at a reference image,
- to the field $C_{C,L1,1}$, the vectors of this field pointing at another reference image.

Figure 5F:
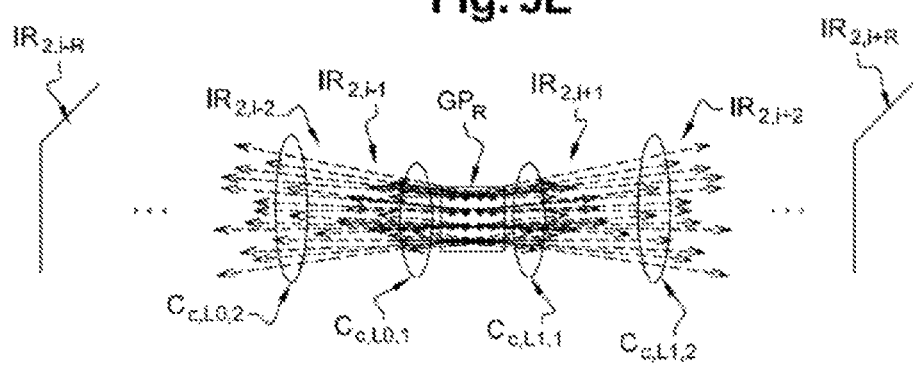

The example illustrated in FIG. 5F represents a generalization of the embodiment represented in FIG. 5E. In the example of FIG. 5E, there is undertaken the calculation of a first plurality R of dense fields of motion vectors $C_{C,L0,1}$, $C_{C,L0,2}$, ..., $C_{C,L0,R}$ and of a second plurality R of dense fields of motion vectors $C_{C,L1,1}$, $C_{C,L1,2}$, ..., $C_{C,L1,R}$, each field of motion vectors containing sixteen motion vectors.

The first plurality R of dense fields of motion vectors $C_{C,L0,1}$, $C_{C,L0,2}$, ..., $C_{C,L0,R}$ is calculated between each of the sixteen pixels of the group of pixels $GP_R$ of the first image $IR_1$ and respectively sixteen pixels belonging to R images $IR_{2,i-1}$, $IR_{2,i-2}$, ..., $IR_{2,i-R}$ which are for example situated respectively at instants $t_{i-1}$, $t_{i-2}$, ..., $t_{i-R}$ which precede the instant $t_i$ at which the current image $I_C$ is coded.

The second plurality R of dense fields of motion vectors $C_{C,L1,1}$, $C_{C,L1,2}$, ..., $C_{C,L1,R}$ is calculated between each of the sixteen pixels of the group of pixels $GP_R$ of the first image $IR_1$ and respectively sixteen pixels belonging to R images $IR_{2,j+1}$, $IR_{C,L1,2}$, ..., $IR_{2,i-R}$ which are for example situated respectively at instants $t_{i+1}$, $t_{i+2}$, ..., $t_{i+R}$ which follow the instant $t_i$ at which the current image $I_C$ is coded.

Prior to the prediction step C4 or D5, there is undertaken:
- the selection, in the first plurality R of dense fields of motion vectors $C_{C,L0,1}$, $C_{C,L0,2}$, ..., $C_{C,L0,R}$ which is contained in the list of candidate predictors, of a single field of motion vectors, denoted $C_{C,L0,q}$, with $1 \leq q \leq R$,
- the selection, in the second plurality R of dense fields of motion vectors $C_{C,L1,1}$, $C_{C,L1,2}$, ..., $C_{C,L1,R}$ which is contained in the list of candidate predictors, of a single field of motion vectors, denoted $C_{C,L1,q}$, with $1 \leq q \leq R$.

Such a selection is for example implemented with the aid of a mathematical or statistical function some examples of which were cited above in the description.

In the course of the aforementioned step C4 or D5, there is undertaken the prediction of the pixels or of the motion of the current group $GP_C$ of sixteen pixels on the basis of the two fields of motion vectors $C_{C,L0,q}$ and $C_{C,L1,q}$ selected.

The prediction of the current group $GP_C$ of sixteen pixels is therefore implemented with respect:
- to the field $C_{C,L0,q}$, the vectors of this field pointing at a reference image,
- to the field $C_{C,L1,q}$, the vectors of this field pointing at another reference image.

Figure 5G:
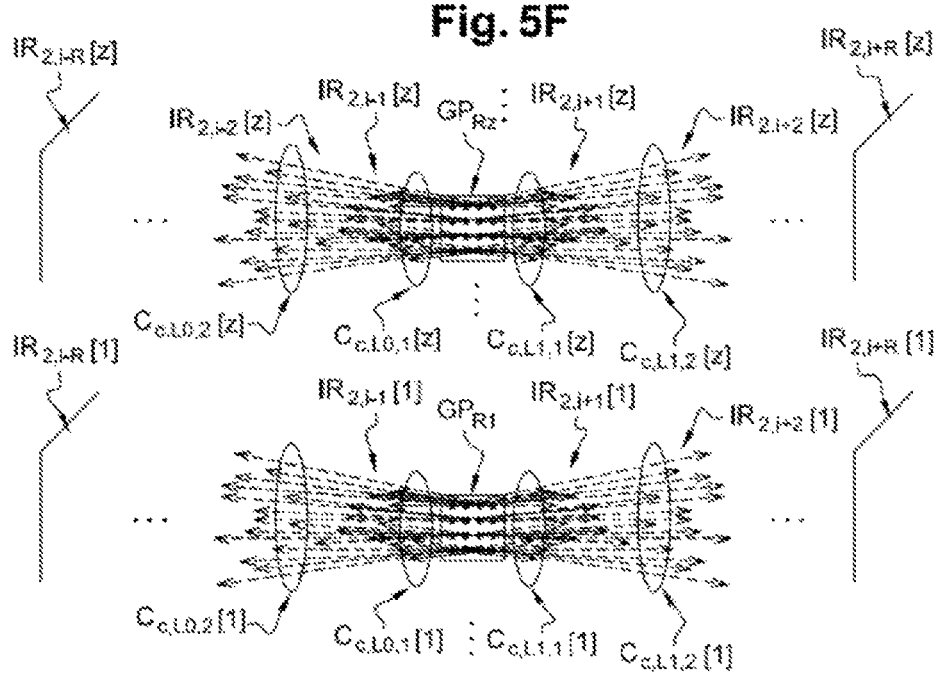

The example illustrated in FIG. 5G differs from the example of FIG. 5F by the fact that the calculation of a first plurality R of dense fields of motion vectors $C_{C,L0,1}$, $C_{C,L0,2}$, ..., $C_{C,L0,R}$ and of a second plurality R of dense fields of motion vectors $C_{C,L1,1}$, $C_{C,L1,2}$, ... $C_{C,L1,R}$, is performed, no longer with respect to a single group of pixels $GP_R$, but with respect to a plurality V of groups of pixels $GP_{R1}$, $GP_{R2}$, ..., $GP_{Rz}$, ..., $GP_{RV}$, with $1<z \leq V$. These latter are determined, in the course of the aforementioned step C2 or D3, as V groups of sixteen pixels corresponding respectively, in V first images $IR_{1,1}$, $IR_{1,2}$, ..., $IR_{1,z}$, ... $IR_{1,V}$, to the current group of pixels $GP_C$.

In the course of the aforementioned step C3 or D4, there is undertaken the calculation:
- entailing the first image $IR_{1,1}$, of a first plurality R of dense fields of motion vectors $C_{C,L0,1[1]}$, $C_{C,L0,2[1]}$, ..., $C_{C,L0,R[1]}$ and of a second plurality R of dense fields of motion vectors $C_{C,L1,1[1]}$, $C_{C,L1,2[1]}$, ..., $C_{C,L1,R[1]}$, each field of motion vectors containing sixteen motion vectors,
- ...,
- entailing the first image $IR_{1,z}$, of a first plurality R of dense fields of motion vectors $C_{C,L0,1[z]}$, $C_{C,L0,2[z]}$, ..., $C_{C,L0,R[z]}$ and of a second plurality R of dense fields of motion vectors $C_{C,L1,1[z]}$, $C_{C,L1,2[z]}$, ..., $C_{C,L1,R[z]}$, each field of motion vectors containing sixteen motion vectors,
- ...,
- entailing the first image $IR_{1,V}$, of a first plurality R of dense fields of motion vectors $C_{C,L0,1[V]}$, $C_{C,L0,2[V]}$, ..., $C_{C,L0,R[V]}$ and of a second plurality R of dense fields of motion vectors $C_{C,L1,1[V]}$, $C_{C,L1,2[V]}$, ..., $C_{C,L1,R[V]}$, each field of motion vectors containing sixteen motion vectors.

Prior to the prediction step C4 or D5, there is undertaken the selection of two fields of motion vectors, on the basis of said list of candidate predictors.

According to a first option, a mathematical or statistical function of the aforementioned type is applied:
- to the set of the first pluralities of fields of motion vectors $C_{C,L0,1[1]}$, $C_{C,L0,2[1]}$, ..., $C_{C,L0,R[1]}$, $C_{C,L0,1[z]}$, $C_{C,L0,2[z]}$, ..., $C_{C,L0,R[z]}$, ..., $C_{C,L0,1[V]}$, $C_{C,L0,2[V]}$, ..., $C_{C,L0,R[V]}$, so as to select a single field of motion vectors, denoted $C_{C,L0,sel}$.
- to the set of the second pluralities of fields of motion vectors $C_{C,L1,1[1]}$, $C_{C,L1,2[1]}$, ..., $C_{C,L1,R[1]}$, ..., $C_{C,L1,1[z]}$, $C_{C,L1,2[z]}$, ..., $C_{C,L1,R[z]}$, ..., $C_{C,L1,1[V]}$, $C_{C,L1,2[V]}$, ..., $C_{C,L1,R[V]}$, so as to select a single field of motion vectors, denoted $C_{C,L1,sel}$.

In the course of the aforementioned step C4 or D5, there is undertaken the prediction of the pixels or of the motion of the current group $GP_C$ of sixteen pixels on the basis of the two fields of motion vectors $C_{C,L0,sel}$ and $C_{C,L1,sel}$ selected.

The prediction of the pixels or of the motion of the current group $GP_C$ of sixteen pixels is therefore implemented with respect:
- to the field $C_{C,L0,sel}$, the vectors of this field pointing at a reference image,
- to the field $C_{C,L1,sel}$, the vectors of this field pointing at another reference image.

According to a second option:
- in conjunction with the first image $IR_{1,1}$, a mathematical or statistical function of the aforementioned type and denoted $f_1$ is applied to the first plurality R of dense fields of motion vectors $C_{C,L0,1[1]}$, $C_{C,L0,2[1]}$, ..., $C_{C,L0,R[1]}$ and to the second plurality R of dense fields of motion vectors $C_{C,L1,1[1]}$, $C_{C,L1,2[1]}$, ..., $C_{C,L1,R[1]}$, so as to select respectively a first field of motion vectors, denoted $C_{C,L0,sel[1]}$ and a second field of motion vectors, denoted $C_{C,L1,sel[1]}$,
- ...,
- in conjunction with the first image $IR_{1,z}$, a mathematical or statistical function of the aforementioned type and denoted $f_z$ is applied to the first plurality R of dense fields of motion vectors $C_{C,L0,1[z]}$, $C_{C,L0,2[z]}$, ..., $C_{C,L0,R[z]}$ and to the second plurality R of dense fields of motion vectors $C_{C,L1,1[z]}$, $C_{C,L1,2[z]}$, ..., $C_{C,L1,R[z]}$, so as to select respectively a first field of motion vectors, denoted $C_{C,L0,sel[z]}$ and a second field of motion vectors denoted $C_{C,L1,sel[z]}$,
- ..., in conjunction with the last image $IR_{1,V}$ of the first images, a mathematical or statistical function of the aforementioned type and denoted $f_V$ is applied to the first plurality R of dense fields of motion vectors $C_{C,L0,1[V]}, C_{C,L0,2[V]}, \ldots, C_{C,L0,R[V]}$ and to the second plurality R of dense fields of motion vectors $C_{C,L1,1[V]}, C_{C,L1,2[V]}, \ldots, C_{C,L1,R[V]}$, so as to select respectively a first field of motion vectors, denoted $C_{C,L0,sel[V]}$ and a second field of motion vectors, denoted $C_{C,L1,sel[V]}$.

A mathematical or statistical function of the aforementioned type, denoted $F_M$, is thereafter applied to the set of the fields of motion vectors selected $C_{C,L0,sel[1]}, \ldots, C_{C,L0,sel[z]}, \ldots, C_{C,L0,sel[V]}$ on the one hand, and $C_{C,L1,sel[1]}, \ldots, C_{C,L1,sel[z]}, \ldots, C_{c,L1,sel[V]}$ on the other hand, so as to obtain two fields of motion vectors $C_{c,L0,sel}$ and $C_{c,L1,sel}$.

In the course of the aforementioned step C4 or D5, there is undertaken the prediction of the pixels or of the motion of the current group $GP_C$ of sixteen pixels on the basis of the two fields of motion vectors $C_{c,L0,sel}$ and $C_{c,L1,sel}$ which have been selected.

According to an example associated with this second option, the functions $f_1, f_2, \ldots, f_z, \ldots f_V$ are medians and the function $f_M$ is a mean.

The function $f_M$ can moreover be a weighted mean. In this case, for each of the V first images $IR_{1,1}, IR_{1,2}, \ldots, IR_{1,z}, \ldots IR_{1,V}$, a coefficient of higher or lower weight is assigned to each of the fields of motion vectors selected $C_{C,L0,sel[1]}, \ldots, C_{C,L0,sel[z]}, \ldots, C_{C,L0,sel[V]}$ and $C_{C,L1,sel[1]}, \ldots, C_{C,L1,sel[z]}, \ldots, C_{C,L1,sel[V]}$, as a function of the respectively higher or lower reliability of the coding/decoding of the V first images $IR_{1,1}, IR_{1,2}, \ldots, IR_{1,z}, \ldots IR_{2,i+1[V]}$. Such an arrangement makes it possible to obtain a much more precise prediction of the current group $GP_C$ of k pixels.

According to a third option:
in conjunction with the set of the second images $IR_{2,i-1[1]}, \ldots, IR_{2,i-1[z]}, \ldots, IR_{2,i-1[V]}$ situated at the instant $t_{i-1}$ and the set of the second images $IR_{2,i+1[1]}, \ldots, IR_{2,i+1[z]}, \ldots, IR_{2,i+1[V]}$ situated at the instant $t_{i+1}$, a mathematical or statistical function of the aforementioned type and denoted $f'_1$ is applied to:
the plurality V of dense fields of motion vectors $C_{C,L0,1[1]}, \ldots, C_{C,L0,1[z]}, \ldots, C_{C,L0,1[V]}$,
and to the plurality V of dense fields of motion vectors $C_{C,L1,1[1]}, \ldots, C_{C,L1,1[z]}, \ldots, C_{C,L1,1[V]}$,
so as to select respectively two fields of motion vectors, denoted $C'_{C,L0,sel[1]}$ and $C'_{C,L1,sel[1]}$,
in conjunction with the set of the second images $IR_{2,i-2[1]}, \ldots, IR_{2,i-2[z]}, \ldots, IR_{2,i-2[V]}$ situated at the instant $t_{i-2}$ and the set of the second images $IR_{2,i+2[1]}, \ldots, IR_{2,i+2[z]}, \ldots, IR_{2,i+2[V]}$ situated at the instant $t_{i+2}$, a mathematical or statistical function of the aforementioned type and denoted $f'_2$ is applied to:
the plurality V of dense fields of motion vectors $C_{C,L0,2[1]}, \ldots, C_{C,L0,2[z]}, \ldots, C_{C,L0,2[V]}$,
and to the plurality V of dense fields of motion vectors $C_{C,L1,2[1]}, \ldots, C_{C,L1,2[z]}, \ldots, C_{C,L1,2[V]}$,
so as to select respectively two fields of motion vectors, denoted $C'_{C,L0,sel[2]}$ and $C'_{C,L1,sel[2]}$,
$\ldots$,
in conjunction with the set of the second images $IR_{2,i-R[1]}, \ldots, IR_{2i-R[z]}, \ldots, IR_{2,i-R[V]}$ situated at the instant $t_{i-R}$ and the set of the second images $IR_{2,i+R[1]}, \ldots, IR_{2,i+R[z]}, \ldots, IR_{2,i+R[V]}$ situated at the instant $t_{i+R}$, a mathematical or statistical function of the aforementioned type and denoted $f'_R$ is applied to:
the plurality V of dense fields of motion vectors $C_{C,L0,R[1]}, \ldots, C_{C,L0,R[z]}, \ldots, C_{C,L0,R[V]}$,
and to the plurality V of dense fields of motion vectors $C_{C,L1,R[1]}, \ldots, C_{C,L1,R[z]}, \ldots, C_{C,L1,R[V]}$,
so as to select respectively two fields of motion vectors, denoted $C'_{C,L0>sel[R]}$ and $C'_{C,L1,sel[R]}$.

A mathematical or statistical function of the aforementioned type, denoted $F'_M$, is thereafter applied to the set of the fields of motion vectors selected $C'_{C,L0,sel[1]}, C'_{C,L0,sel[2]}, \ldots, C'_{C,L0,sel[R]}$, on the one hand, and $C'_{C,L1,sel[1]}, C'_{C,L1,sel[2]}, \ldots, C'_{C,L1,sel[R]}$, on the other hand, so as to obtain two fields of motion vectors $C'_{C,L0,sel}$ and $C'_{C,L1,sel}$.

In the course of the aforementioned step C4 or D5, there is undertaken the prediction of the pixels or of the motion of the current group $GP_C$ of sixteen pixels on the basis of the fields $C'_{C,L0,sel}$ and $C'_{C1,L1,sel}$ of sixteen motion vectors which have been selected.

According to an example associated with this second option, the functions $f'_1, f'_2, \ldots, f'_R$ are medians and the function $f'_M$ is a mean.

The function $f'_M$ can moreover be a weighted mean. In this case, for each of the aforementioned R sets of second images, a coefficient of higher or lower weight is assigned to each of the fields of motion vectors selected $C'_{C,L0,sel[1]}, C'_{C,L0,sel[2]}, \ldots C'_{C,L0,sel[R]}$ and $C'_{C,L1,sel[1]}, C'_{C,L1,sel[2]}, \ldots, C'_{C,L1,sel[R]}$ as a function of the respectively higher or lower reliability of the coding/decoding of the corresponding R sets of second images. Thus, for a first image considered, $IR_{1,z}$ for example, the more the temporal distance between $IR_{1,z}$ on the one hand, and $IR_{2,i-1[z]}$ (respectively $IR_{2,i+1,z}$), $\ldots, IR_{2,i-R[z]}$ (respectively $IR_{2,i+R[z]}$) increases, the less reliable is the estimation of the field of motion vectors. The coefficients of lowest weights will therefore be assigned to the fields of motion vectors which point toward images having the largest temporal distances with the image $IR_{1,z}$. Such an arrangement makes it possible to obtain a much more precise prediction of the pixels or of the motion of the current group $GP_C$ of k pixels.

Figure 5H:
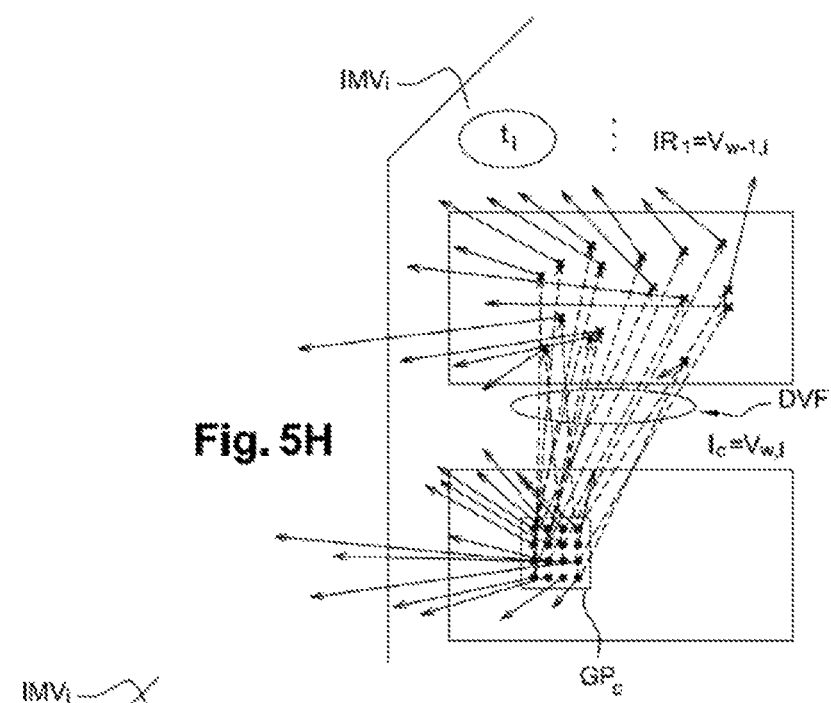

In the example illustrated in FIG. 5H, the video coding is of 3D type and each image to be coded in the sequence of images SI is a multi-view image which may be for example in the MVV or MVD format. At a current instant $t_i$, a multi-view image $IMV_i$ comprises T views $V_{1,i}, V_{2,i}, \ldots, V_{w,i}, \ldots V_{T,i}$ where $1 \leq w \leq T$, each of these views representing one and the same scene according to respectively T different viewpoints.

In FIG. 5H:
the current image $I_C$ is a current view $V_{w,i}$ situated at the current instant $t_i$ in the current multi-view image $IMV_i$,
the first image $IR_1$ is a view $V_{w-1,i}$ situated at the instant $t_i$, said view being situated immediately above the current view $V_{w,i}$ in the current multi-view image $IMV_i$ and having already been coded and then decoded,
the second image $IR_2$ not represented is for example identical to that represented in FIG. 5C, that is to say a view $V_{w-1,i-1}$ of a multi-view image $IMV_{i-1}$ which is situated at an instant $t_{i-1}$ immediately preceding the current instant $t_i$,
the third image $IR_3$ not represented is for example identical to that represented in FIG. 5C, that is to say a view $V_{w,i-1}$ of the multi-view image $IMV_{i-1}$ which is situated at an instant $t_{i-1}$ immediately preceding the current instant $t_i$.

In the course of the aforementioned step C2 or D3, the group $GP_R$ of sixteen pixels corresponding, in the first image $IR_1$, to the sixteen pixels of the current group of pixels $GP_C$ of the current image $I_C$, is determined by means of a field DVF of disparity vectors for the disparity between the current image $I_C$ and the first image $IR_1$. The field DVF comprises sixteen disparity vectors represented dashed in FIG. 5H. The sixteen pixels pointed at respectively by these sixteen vectors constitute said group $GP_R$. Such a field DVF is dense since the sixteen pixels of the group $GP_R$ are not necessarily contiguous.

The aforementioned motion vector field calculation steps C3 or D4, as well as the aforementioned steps C4 or D5 of predicting the pixels or the motion of the current group $GP_C$ of pixels are for example performed in the same manner as in the embodiment represented in FIG. 5C.

Figure 5I:
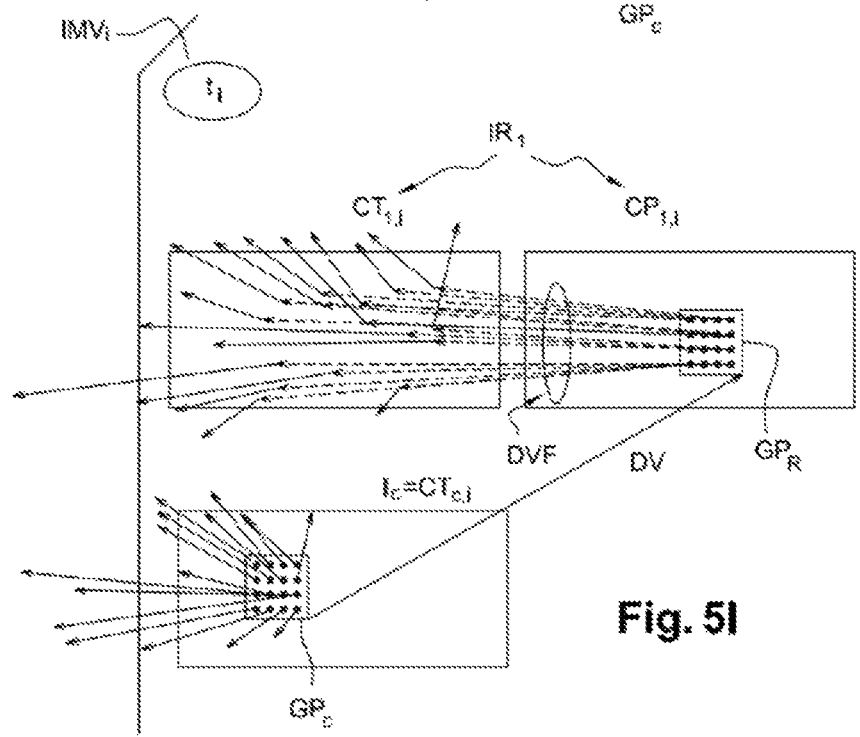

In the example illustrated in FIG. 5I, the video coding is of 3D type and each image to be coded in the sequence of images SI is for example in the MVD format, where the texture components are coded before the depth components.

In FIG. 5I:
the current image $I_C$ is for example a first current texture component $CT_{C,i}$ situated at the current instant $t_i$ in the current multi-view image $IMV_i$,
the first image $IR_1$ comprises:
a texture component $CT_{1,i}$ situated at the current instant $t_i$ in the current multi-view image $IMV_i$,
a depth component $CP_{1,i}$ which, at the current instant $t_i$, is associated with the texture component $CT_{1,i}$ in the multi-view image $IMV_i$,
the third image $IR_3$ not represented comprises for example a texture component $CT_{3,i-1}$ and a depth component $CP_{3,i-1}$ which are situated at an instant $t_{i-1}$ in a multi-view image $IMV_{i-1}$ not represented immediately preceding the multi-view image $IMV_i$.

In the course of the aforementioned step C2 or D3, the group $GP_R$ of sixteen pixels corresponding, in the depth component $CP_{1,i}$ of the first image $IR_1$, to the current group of pixels $GP_C$ of the current image $I_C$, is determined conventionally by a single disparity vector DV.

Having regard to the fact that the format of the images of the sequence SI is of MVD type, the sixteen pixels of the group $GP_R$ are associated respectively with sixteen disparity vectors represented dashed in FIG. 5I and pointing at the texture component $CT_{1,i}$ of the first image $IR_1$. These sixteen disparity vectors form a dense field of disparity vectors DVF.

In the course of the aforementioned step C3 or D4, there is undertaken the calculation of the dense field $C_C$ of sixteen motion vectors associated with each of the sixteen pixels of the texture component $CT_{1,i}$ pointed at by a disparity vector of the field DVF. The dense field $C_C$ contains sixteen motion vectors which are represented by solid arrows in FIG. 5I.

In the course of the aforementioned step C4 or D5, there is undertaken the prediction of the pixels or of the motion of the current group $GP_C$ of sixteen pixels on the basis of the field $C_C$ of sixteen motion vectors which was calculated in step C3 or D4, with respect to said third image $IR_3$.

Figure 5J:
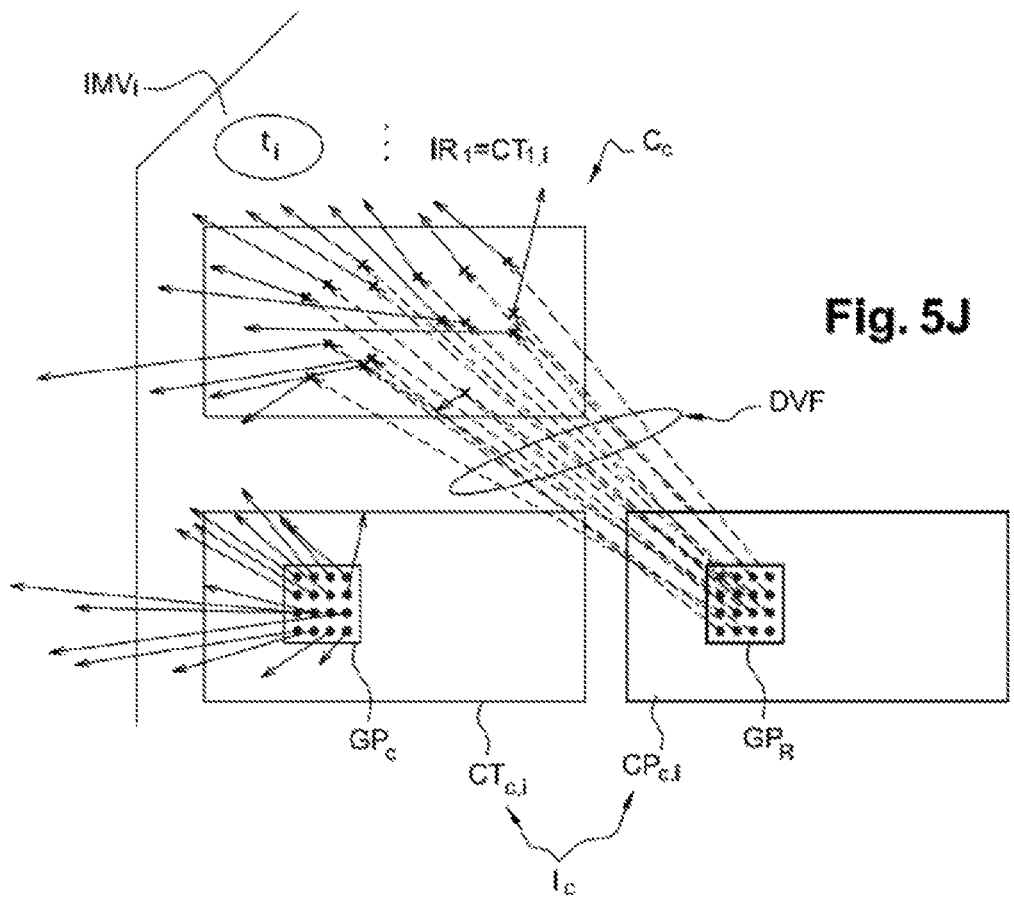

In the example illustrated in FIG. 5J, the video coding is of 3D type and each image to be coded in the sequence of images SI is for example in the MVD format where the depth components are coded before the texture components.

In FIG. 5J:
the current image $I_C$ comprises
a texture component $CT_{C,i}$ situated at the current instant $t_i$ in the current multi-view image $IMV_i$,
a depth component $CP_{C,i}$ which, at the current instant $t_i$, is associated with the texture component $CT_{1,i}$ in the multi-view image $IMV_i$,
the first image $IR_1$ is a texture component $CT_{1,i}$ in the multi-view image $IMV_i$, at the current instant $t_i$.

In the course of the aforementioned step C2 or D3, there is undertaken the search for the co-located group $GP_R$ of sixteen pixels in the depth component $CP_{C,i}$.

Having regard to the fact that the format of the images of the sequence SI is of MVD type, the sixteen pixels of the group $GP_R$ are associated respectively with sixteen disparity vectors represented dashed in FIG. 5J and pointing at the texture component $CT_{1,i}$ of the first image $IR_1$. These sixteen disparity vectors form a dense field DVF of disparity vectors.

In the course of the aforementioned step C3 or D4, there is undertaken the calculation of the dense field $C_C$ of sixteen motion vectors associated with each of the sixteen pixels of the image $IR_1$ pointed at by a disparity vector of the field DVF. The dense field $C_C$ contains sixteen motion vectors which are represented by solid arrows in FIG. 5J.

In the course of the aforementioned step C4 or D5, there is undertaken the prediction of the pixels or of the motion of the current group $GP_C$ of sixteen pixels by inheritance of the field $C_C$ of sixteen motion vectors which was calculated in step C3 or D4, with respect to a reference image, not represented.

Figure 5K:
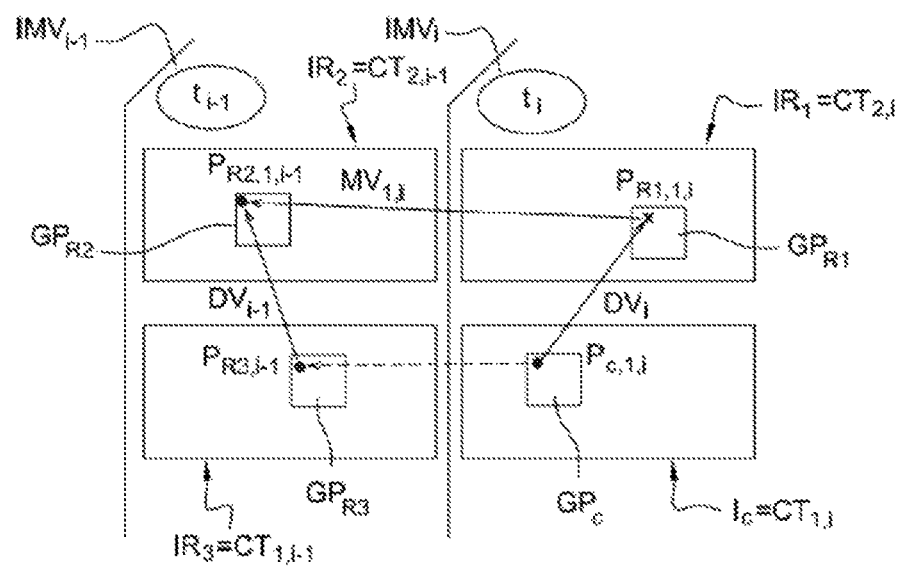

In the example illustrated in FIG. 5K, the video coding is of 3D type and each image to be coded in the sequence of images SI is a multi-view image in the MVD format. At a current instant $t_i$, a multi-view image $IMV_i$ comprises T views $V_{1,i}, V_{2,i}, \ldots, V_{w,i}, \ldots V_{T,i}$ where $1 \leq w \leq T$, each of these views representing one and the same scene according to respectively T different viewpoints.

In FIG. 5K:
the current image $I_C$ is a first texture component $CT_{1,i}$ situated at the current instant $t_i$ in the current multi-view image $IMV_i$,
the first image $IR_1$ is a second texture component $CT_{2,i}$ situated at the current instant $t_i$ in the current multi-view image $IMV_i$,
the second image $IR_2$ is a third texture component $CT_{2,i-1}$ of a multi-view image $IMV_{i-1}$ which is situated at an instant $t_{i-1}$ immediately preceding the current instant $t_i$,
the third image $IR_3$ is a fourth texture component $CT_{1,i-1}$ of the multi-view image $IMV_{i-1}$.

In the course of the aforementioned step C2 or D3, a group of sixteen depth pixels corresponding to the current group of pixels $GP_C$ of the current image $I_C$ is determined conventionally, for example according to one of the schemes represented in FIG. 5I or 5J. A single disparity vector $DV_i$ obtained according to one of these schemes is represented in FIG. 5K. This disparity vector is determined between the depth component (not represented) associated with the texture component $CT_{1,i}$ of the current image $I_C$ and the depth component (not represented) associated with the texture component $CT_{2,i}$ of the first image $IR_1$.

Having regard to the fact that the format of the images of the sequence SI is of MVD type, the sixteen pixels of the group of said depth component are associated respectively with sixteen disparity vectors (not represented) pointing at the texture component $CT_{2,i}$. These sixteen disparity vectors form a dense field of disparity vectors which points at a group $GP_{R1}$ of sixteen pixels of the texture component $CT_{2,i}$ and whose origin is the group of pixels $GP_C$ of the texture component $CT_{2,i}$ as illustrated in FIG. 5K.

For reasons of simplification of FIG. 5K, a single pixel is represented per group. It is the first pixel $p_{c,i}$ for the current group of pixels $GP_C$ and the first pixel $P_{R1,1,i}$ for the group of reference pixels $GP_R$.

Thereafter there is undertaken the calculation of a motion vector $MV_{1,i}$ which describes the motion of the first pixel $P_{R1,1,i}$ of the group of pixels $GP_{R1}$ of the texture component $CT_{2,i}$ and of a first pixel $P_{R2,1,i-1}$ corresponding to the pixel $P_{R1,1,i}$ in a group $GP_{R2}$ of pixels of the texture component $CT_{2,i-1}$. For reasons of simplification of FIG. 5K, only the first pixel of the group $GP_{R2}$ of pixels which contains sixteen of them is represented.

This calculation step is repeated to calculate the fifteen motion vectors associated respectively with the fifteen pixels, not represented, of the group of pixels $GP_{R1}$. A field of motion vectors is then obtained, which points at the group $GP_{R2}$. The sixteen pixels of the group $GP_{R2}$ are respectively associated with sixteen motion vectors which form a dense field of motion vectors $C_{R2,i-1}$. Said field of motion vectors obtained is for example added to the aforementioned list of candidate predictors.

In the course of a new step similar to the aforementioned step C2 or D3, a group of sixteen depth pixels corresponding to the group of pixels $GP_{R2}$ of the texture component $CT_{2i-1}$, is determined conventionally, for example according to one of the schemes represented in FIG. 5I or 5J. At least one disparity vector DVM obtained according to one of these schemes is represented in FIG. 5K.

Having regard to the fact that the format of the images of the sequence SI is of MVD type, the sixteen pixels of the group of said depth component are associated respectively with sixteen disparity vectors (not represented) pointing at the texture component $CT_{2,i-1}$. These sixteen disparity vectors form a field of disparity vectors whose origin is a group of pixels $GP_{R3}$ of sixteen pixels of the texture component $CT_{1,i-1}$.

In the course of the aforementioned step C3 or D4, there is undertaken the calculation of the first motion vector $MV_{C,1}$ making up a current dense field $C_{C1}$ of motion vectors, between the first current pixel $P_{C,1,i}$ of the current group of pixels $GP_C$ of the texture component $CT_{1,i}$ and the corresponding first pixel $P_{R3,1,i-1}$ of the group of pixels $GP_{R3}$ of the texture component $CT_{1,i-1}$. The motion vector $MV_{C,1}$ is represented dashed in FIG. 5K.

For this purpose, such a calculation is performed in accordance with the rules of epipolar geometry in the following manner, where the value of the motion vector $MV_{C,1}$ is the unknown represented in bold characters:

$$P_{c1,i}+DV_i(P_{c1,i})+MV_{1,i}(P_{c1,i}+DV_i(P_{c1,i}))=$$
$$P_{c1,i}+MV_{C,1}(pc1,i)+DV_{i-1}(P_{c1,i}+MV_{C,1}(pc1,i)).$$

Step C3 or D4 is repeated to calculate the other fifteen motion vectors associated respectively with the other fifteen pixels not represented of the current group of pixels $GP_C$.

Subsequent to step C3 or D4, the dense field $C_{C1}$ of motion vectors, composed of the sixteen motion vectors calculated, is then obtained. Said field $C_{C1}$ is for example added to the aforementioned list of candidate predictors.

In the course of the aforementioned step C4 or D5, there is undertaken the prediction of the pixels or of the motion of the current group $GP_C$ of sixteen pixels by means of the dense field $C_{C1}$ of motion vectors, with respect to the texture component $CT_{1,i-1}$.

It should be noted that a dense field $C_C$ of motion vectors such as this may contain holes, because not all the pixels of the group $GP_{R2}$ are pointed at by a disparity vector $DV_{i-1}$. However, the embodiment of FIG. 5K is particularly advantageous in the sense that it makes it possible to compensate for the deformations of the image which are caused by the fact that the motion of an object filmed from one movie camera to the other, is not exactly the same because of the different arrangement of the movie cameras.

Moreover, in order to improve the prediction of the current group of pixels, the embodiment represented in FIG. 5K may be combined with the embodiment represented in FIG. 5J.

It goes without saying that the embodiments which have been described hereinabove have been given purely byway of wholly non-limiting indication, and that numerous modifications may easily be made by the person skilled in the art without however departing from the scope of the invention.

The invention claimed is:

1. A method for coding a current image comprising the following acts:
determining by a coding device, in a first image, a group of k' pixels corresponding to a current group of k pixels to be coded of the current image, where k'≤k and k'>1;
calculating by the coding device a motion vector between each of the k' pixels of the first image and a corresponding pixel of a second image, on completion of which a dense field of k' motion vectors is obtained, wherein the dense field of k' motion vectors is produced from an optical flow of a motion compensation to be associated with the current image, and wherein the first and second images are different from the current image and are already coded then decoded, the first image is a reference image for the current image, and the second image is a reference image for the first image,
predicting with the coding device the pixels or the motion of the current group of k pixels of said current image on the basis of the dense field of k' motion vectors which is obtained, and
transmitting over a communication network a data stream formulated on the basis of the predicted pixels or motion to a decoding device for decoding.

2. The coding method as claimed in claim 1, in which:
said predicting act comprises predicting the k pixels of said current group of pixels by corresponding pixels of an image different from said current image, said corresponding pixels being pointed at respectively by the k' motion vectors of said dense field of motion vectors which is obtained, and
said coding method furthermore comprising the following acts:
obtaining of a current residual group of pixels by calculating the difference between the current group of k pixels and the predictor group of pixels which is obtained on completion of the predicting act,
formulation of the data stream containing the current residual group of pixels which is obtained.

3. The coding method as claimed in claim 1, in which:
said predicting act comprises in predicting k motion vectors associated respectively with the k pixels of said current group of pixels, by the k' motion vectors of said dense field of motion vectors which is obtained, and
said coding method furthermore comprising the following acts:
obtaining of a current residual field of motion vectors by calculating the difference between said k current motion vectors associated with the current group of pixels and said k' vectors of said dense field of motion vectors which is obtained,
formulation of the data stream containing said current residual field of motion vectors which is obtained.

4. The coding method as claimed in claim 1, in which in the course of said predicting act, the following acts are undertaken:

selection of a motion vector from among the k' motion vectors of said calculated dense field of motion vectors, by means of a mathematical or statistical function, prediction of a motion vector associated with said of the current group of pixels with the aid of said selected motion vector, said coding method furthermore comprising the following acts:

obtaining of a current residual motion vector by calculating the difference between the motion vector associated with the current group of pixels and the predictor motion vector obtained on completion of the predicting act, formulation of the data stream containing said current residual motion vector obtained.

5. The coding method as claimed in claim 1, in which, when the image coding is of 3D type, the k' pixels of the first image are determined either as a group of pixels which is pointed at by a single disparity motion vector for the disparity between the current image and the first image, or as a group of pixels which are pointed at respectively by vectors of a field of disparity motion vectors for the disparity between the current image and the first image.

6. The coding method as claimed in claim 1, in which:

said calculating act comprises calculating a plurality of fields of motion vectors between, on the one hand, pixels of a plurality of first images and, on the other hand, pixels corresponding in a plurality of second images different from the current image, said method furthermore comprising selecting a field of motion vectors from among the fields of motion vectors calculated, by using a mathematical or statistical function, said predicting act comprising predicting the motion or the pixels of the current group of pixels on the basis of the selected field of motion vectors.

7. A coding device for coding a current image comprising:
a processor and
a non-transitory computer-readable medium comprising instructions stored thereon, which when executed by the processor configure the coding device to perform acts comprising:

determining, in a first image, a group of k' pixels corresponding to a current group of k pixels (k'≤k) to be coded of the current image, calculating a motion vector between each of the k' pixels of the first image and a corresponding pixel of a second image, so as to obtain a dense field of k' motion vectors, wherein the dense field of k' motion vectors is produced from an optical flow of a motion compensation to be associated with the current image, and wherein the first and second images are different from the current image and are already coded then decoded, the first image is a reference image for the current image, and the second image is a reference image for the first image, predicting the pixels or the motion of the current group of k pixels of said current image on the basis of the dense field of k' motion vectors which is obtained, and transmitting over a communication network a data stream formulated on the basis of the predicted pixels or motion to a decoding device for decoding.

8. A method for decoding a data stream representative of a current coded image comprising the following acts:

receiving the data stream, sent by a coding device over a communication network, determining by the decoding device, in a first image, a group of k' pixels corresponding to a current group of k pixels to be decoded of the current image, where k'≤k and k'>1, calculating by the decoding device k' motion vectors between each of the k' pixels of the first image and a corresponding pixel of a second image, on completion of which a dense field of k' motion vectors is obtained, wherein the dense field of k' motion vectors is produced from an optical flow of a motion compensation to be associated with the current image, and wherein the first and second images are different from the current image and are already decoded, the first image is a reference image for the current image, and the second image is a reference image for the first image, performing an inverse prediction of the pixels or of the motion of the current group of k pixels of said current image on the basis of the dense field of k' motion vectors which is obtained, and reconstructing the current image on the basis of the inverse prediction.

9. The decoding method as claimed in claim 8, in which said inverse prediction acts comprises:

determining, in said data stream, a current residual group of pixels which is associated with the current group of k pixels, reconstructing the k pixels of said current group of pixels on the basis of the corresponding pixels of an image different from the current image, said corresponding pixels being pointed at respectively by the k' motion vectors of said dense field of motion vectors which is obtained, and on the basis of said determined current residual group of pixels.

10. The decoding method as claimed in claim 8, in which said inverse prediction act comprises:

determining, in said data stream, a current residual field of motion vectors which is associated with the current group of k pixels, reconstructing k motion vectors associated respectively with the k pixels of said current group of pixels, on the basis of the k' motion vectors of said dense field of motion vectors which is obtained and of said determined current residual field of motion vectors.

11. The decoding method as claimed in claim 8, in which in the course of said inverse prediction act, the following acts are undertaken:

determination, in said data stream, of a current residual motion vector associated with the current group of k pixels, selection of a motion vector from among the k' motion vectors of said dense field of motion vectors which is obtained, by means of a mathematical or statistical function, reconstruction of a motion vector associated with the current group of pixels with the aid of said selected motion vector and of the determined current residual motion vector.

12. The decoding method as claimed claim 8, in which when the image decoding is of 3D type, the k' pixels contained in the first image are determined either as a group of pixels which is pointed at by a single disparity motion vector for the disparity between the current image and the first image, or as a group of pixels whose pixels are pointed at respectively by vectors of a field of disparity motion vectors for the disparity between the current image and the first image.

13. The decoding method as claimed in claim 8, in which:
said calculating act comprises calculating a plurality of fields of motion vectors between, on the one hand, pixels of a plurality of first images and, on the other hand, corresponding pixels in a plurality of second images different from the current image, said method furthermore comprising selecting a field of motion vectors from among the fields of motion vectors calculated, by means of a mathematical or statistical function, said inverse prediction act comprises reconstructing the motion or the pixels of the current group of pixels on the basis of the selected field of motion vectors.

14. A decoding device for decoding a data stream representative of a current image comprising:
a processor; and
a non-transitory computer-readable medium comprising instructions stored thereon, which when executed by the processor configure the decoding device to perform acts comprising:
receiving the data stream, sent by a coding device over a communication network,
determining, in a first image, a group of k' pixels corresponding to a current group of k pixels to be decoded of the current image, where k'≤k and k'>1,
calculating a motion vector between each of the k' pixels of the first image and a corresponding pixel of a second image, so as to obtain a dense field of k' motion vectors, wherein the dense field of k' motion vectors is produced from an optical flow of a motion compensation to be associated with the current image, and wherein the first and second images are different from the current image and are already decoded, the first image is a reference image for the current image, and the second image is a reference image for the first image,
inverse prediction of the current group of k pixels of said current image on the basis of the dense field of k' motion vectors which is obtained, and
reconstructing the current image on the basis of the inverse prediction.

15. A non-transitory computer-readable medium comprising a computer program stored thereon and comprising program code instructions for execution of method of decoding a data stream representative of a current coded image, when said program is executed on a computer of a decoding device, wherein the instructions configure the decoding device to perform acts of:
receiving the data stream, sent by a coding device over a communication network,
determining by the decoding device, in a first image, a group of k' pixels corresponding to a current group of k pixels to be decoded of the current image, where k'≤k and k'>1,
calculating by the decoding device k' motion vectors between each of the k' pixels of the first image and a corresponding pixel of a second image, on completion of which a dense field of k' motion vectors is obtained, wherein the dense field of k' motion vectors is produced from an optical flow of a motion compensation to be associated with the current image, and wherein the first and second images are different from the current image and are already decoded, the first image is a reference image for the current image, and the second image is a reference image for the first image,
performing an inverse prediction of the pixels or of the motion of the current group of k pixels of said current image on the basis of the dense field of k' motion vectors which is obtained, and
reconstructing the current image on the basis of the inverse prediction.

* * * * *